(12) United States Patent
Nagai et al.

(10) Patent No.: US 7,930,380 B2
(45) Date of Patent: Apr. 19, 2011

(54) COMPUTER SYSTEM, MANAGEMENT APPARATUS AND MANAGEMENT METHOD

(75) Inventors: Takayuki Nagai, Machida (JP); Daisuke Shinohara, Yokohama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 11/971,289

(22) Filed: Jan. 9, 2008

(65) Prior Publication Data
US 2009/0089412 A1 Apr. 2, 2009

(30) Foreign Application Priority Data

Sep. 28, 2007 (JP) ................................ 2007-255880

(51) Int. Cl.
G06F 15/173 (2006.01)
G06F 13/28 (2006.01)
(52) U.S. Cl. ........................ 709/223; 711/111; 711/114
(58) Field of Classification Search .................. 708/104, 708/105; 709/225, 226, 223; 718/105
See application file for complete search history.

(56) References Cited

U.S. PATENT DOCUMENTS

| | | | | |
|---|---|---|---|---|
| 4,956,803 A * | 9/1990 | Tayler et al. | ............ | 711/113 |
| 6,389,432 B1 * | 5/2002 | Pothapragada et al. | ...... | 707/205 |
| 7,469,289 B2 * | 12/2008 | Arakawa et al. | ............. | 709/224 |
| 2003/0055943 A1 * | 3/2003 | Kanai | ............ | 709/223 |
| 2003/0163568 A1 * | 8/2003 | Kano et al. | ............ | 709/225 |
| 2003/0204597 A1 * | 10/2003 | Arakawa et al. | ............. | 709/226 |
| 2004/0049553 A1 | 3/2004 | Iwamura et al. | | |
| 2005/0138315 A1 * | 6/2005 | Eguchi et al. | ............ | 711/165 |
| 2007/0198722 A1 * | 8/2007 | Kottomtharayil et al. | ..... | 709/226 |
| 2007/0226328 A1 * | 9/2007 | Kusama et al. | ............. | 709/223 |
| 2007/0233868 A1 * | 10/2007 | Tyrrell et al. | ............. | 709/226 |
| 2008/0046671 A1 * | 2/2008 | Sato et al. | ............ | 711/162 |
| 2008/0104216 A1 * | 5/2008 | Ponnappan et al. | .......... | 709/223 |
| 2008/0201458 A1 * | 8/2008 | Salli | ............ | 709/223 |
| 2008/0216086 A1 * | 9/2008 | Tanaka et al. | ............. | 718/105 |

FOREIGN PATENT DOCUMENTS
JP 2004-102374 4/2004
* cited by examiner

Primary Examiner — Joseph E Avellino
Assistant Examiner — Aftab Nasir Khan
(74) Attorney, Agent, or Firm — Antonelli, Terry, Stout & Kraus, LLP.

(57) ABSTRACT

The computer system includes: a first storage system having devices that are various components for storing data transmitted from a host computer; a second storage system having devices that are various components for storing data transmitted from the first storage system; and a management apparatus that manages the first and second storage systems. The management apparatus includes a storage unit that stores configuration information, performance information and threshold values used for performance management regarding the devices in the first and second storage systems connected to the management apparatus; and a setting section that adopts and sets, when internal management information and data are copied from the first storage system to the second storage system, threshold values assigned to the devices in the first storage system to the devices in the second storage systems.

5 Claims, 22 Drawing Sheets

FIG.7

VOLUME LIST

| VOLUME | CONNECTED HOST COMPUTER ID | CAPACITY | RAID GROUP ID |
|---|---|---|---|
| VOL1 | HOST1 | 20GB | RG1 |
| VOL2 | HOST2 | 20GB | RG1 |
| VOL3 | HOST1 | 20GB | RG1 |
| VOL4 | HOST1 | 20GB | RG1 |
| VOL5 | HOST2 | 40GB | RG2 |
| VOL6 | HOST2 | 40GB | RG2 |
| : | : | : | : |

FIG.8

RAID GROUP LIST

| RAID GROUP ID | RAID LEVEL | DISK DRIVE ID | CAPACITY |
|---|---|---|---|
| RG1 | RAID1 | DISK1, DISK2 | 100GB |
| RG2 | RAID1 | DISK3, DISK4 | 100GB |
| : | : | : | : |

FIG.9

I/O PORT LIST

| I/O PORT ID | IP ADDRESS | SUBNET MASK | DEFAULT GATEWAY | VOLUME ID |
|---|---|---|---|---|
| PORT1 | 11.11.11.11 | 255.255.255.0 | 11.11.11.1 | VOL1, VOL2, VOL3, VOL4 |
| PORT2 | 11.11.11.12 | 255.255.255.0 | 11.11.11.1 | VOL5, VOL6 |
| : | : | : | : | : |

DEVICE MODEL LIST

| DEVICE ID | MODEL ID |
|---|---|
| CTL1 | CTL-1 |
| CTL2 | CTL-1 |
| RG1 | DISK-1 |
| RG2 | DISK-1 |
| : | : |

STORAGE BASIC INFORMATION LIST

| STORAGE ID (46A) | MANAGEMENT PORT IP ADDRESS (46B) | SUBNET MASK (46C) | DEFAULT GATEWAY (46D) |
|---|---|---|---|
| SYS1 | 11.11.11.21 | 255.255.255.0 | 11.11.11.1 |

FIG.12

STORAGE SYSTEM PERFORMANCE LIST

| STORAGE ID (83A) | DEVICE ID (83B) | METRIC (83C) | PERFORMANCE VALUE (83D) | THRESHOLD VALUE OF ALERT (83E) |
|---|---|---|---|---|
| SYS1 | RG1 | I/O AMOUNT PER UNIT TIME | 40 | 100 |
| SYS1 | RG1 | OPERATION RATE | 40% | 80% |
| SYS1 | RG2 | I/O AMOUNT PER UNIT TIME | 20 | 100 |
| SYS1 | RG2 | OPERATION RATE | 40% | 80% |
| SYS1 | CTL1 | I/O AMOUNT PER UNIT TIME | 30 | 100 |
| SYS1 | CTL1 | OPERATION RATE | 30% | 80% |
| SYS1 | CTL2 | I/O AMOUNT PER UNIT TIME | 40 | - |
| SYS1 | CTL2 | OPERATION RATE | 40% | - |
| : | : | : | : | : |

FIG.13

STORAGE PAIR CONFIGURATION LIST

| ORIGINAL STORAGE SYSTEM ID (103A) | ORIGINAL STORAGE SYSTEM'S DEVICE ID (103B) | REPLICA STORAGE SYSTEM ID (103C) | REPLICA STORAGE SYSTEM'S DEVICE ID (103D) |
|---|---|---|---|
| SYS1 | RG1 | SYS2 | RG1 |
| | RG2 | | RG2 |
| | CTL1 | | CTL1 |
| | PORT1 | | PORT1 |
| | DISK1 | | DISK1 |
| | DISK2 | | DISK2 |
| | DISK3 | | DISK3 |
| | DISK4 | | DISK4 |
| ⋮ | ⋮ | ⋮ | ⋮ |

FIG.14

ALERT THRESHOLD SETTING SCREEN 111

SETTING FOR THRESHOLD VALUE OF ALERT

- SETTING TARGET ID — 111A
- THRESHOLD VALUE — 111B
- METRIC — 111C
- MAIL ADDRESS — 111D

111E EXECUTE  111F CANCEL

FIG.15

DATA MIGRATION COMMAND SCREEN 112

DATA MIGRATION COMMAND

- ORIGINAL STORAGE SYSTEM ID — 112A
- REPLICA STORAGE SYSTEM ID — 112B

112C EXECUTE  112D CANCEL

FIG.18

STORAGE SYSTEM PERFORMANCE LIST

| STORAGE ID | DEVICE ID | METRIC | PERFORMANCE VALUE | THRESHOLD VALUE OF ALERT | THRESHOLD RE-CALCULATION FLAG |
|---|---|---|---|---|---|
| SYS1 | RG1 | I/O AMOUNT PER UNIT TIME | 40 | 100 | 0 |
| SYS1 | RG1 | OPERATION RATE | 40% | 80% | 0 |
| SYS1 | RG2 | I/O AMOUNT PER UNIT TIME | 20 | 100 | 0 |
| SYS1 | RG2 | OPERATION RATE | 40% | 80% | 0 |
| SYS1 | CTL1 | I/O AMOUNT PER UNIT TIME | 30 | 100 | 0 |
| SYS1 | CTL1 | OPERATION RATE | 30% | 80% | 0 |
| SYS1 | CTL2 | I/O AMOUNT PER UNIT TIME | 40 | - | 0 |
| SYS1 | CTL2 | OPERATION RATE | 40% | - | .. |
| .. | .. | .. | | | |

DEVICE PAIR LIST

| ORIGINAL STORAGE SYSTEM ID (123A) | ORIGINAL STORAGE SYSTEM'S DEVICE ID (123 B) | ORIGINAL STORAGE SYSTEM'S MODEL ID (123 C) | REPLICA STORAGE SYSTEM ID (123 D) | REPLICA STORAGE SYSTEM'S DEVICE ID (123 E) | REPLICA STORAGE SYSTEM'S MODEL ID (123 F) |
|---|---|---|---|---|---|
| SYS1 | RG1 | DISK-1 | SYS2 | RG1 | DISK-2 |
|  | RG2 | DISK-1 |  | RG2 | DISK-2 |
|  | CTL1 | CTL-1 |  | CTL1 | CTL-2 |
|  | CTL2 | CTL-1 |  | CTL2 | CTL-2 |
| : | : | : | : | : | : |

FIG.20

DEVICE PERFORMANCE LIST

| MODEL ID (124A) | DEVICE TYPE (124B) | DEVICE PERFORMANCE (124C) |
|---|---|---|
| DISK-1 | RAID GROUP | MAGNETIC DISK REVOLUTION SPEED 100 |
| DISK-2 | RAID GROUP | MAGNETIC DISK REVOLUTION SPEED 200 |
| CTL-1 | CONTROLLER | CLOCK SPEED 100 |
| CTL-2 | CONTROLLER | CLOCK SPEED:200 |
| : | : | : |

FIG.21

THRESHOLD RE-CALCULATION POLICY LIST

| DEVICE TYPE | PERFORMANCE VALUE NAME | NECESSITY OF THRESHOLD RE-CALCULATION | THRESHOLD RE-CALCULATION POLICY |
|---|---|---|---|
| RAID GROUP | I/O AMOUNT PER UNIT TIME | YES | MAGNETIC DISK REVOLUTION SPEED |
|  | OPERATION RATE | NO | - |
| CONTROLLER | I/O AMOUNT PER UNIT TIME | YES | CLOCK |
|  | OPERATION RATE | NO | - |
| : | : | : | : |

COMPUTER SYSTEM, MANAGEMENT APPARATUS AND MANAGEMENT METHOD

CROSS-REFERENCES TO RELATED APPLICATIONS

This application relates to and claims priority from Japanese Patent Application No. 2007-255880, filed on Sep. 28, 2007, the entire disclosure of which is incorporated herein by reference.

BACKGROUND

The invention relates generally to a computer system, a management apparatus and a management method, and more specifically to a management apparatus used for a computer system and software for managing the same.

In conventional techniques, switching between an access path for a first storage system and an access path for a second storage system that has data copied from the first storage system has been performed by exchanging cables. For this reason, a maintenance person had to perform the exchange operation at a place where the host system is installed, and remote operation was difficult.

In addition, since plural types of storage areas with different capacities and different disk configurations can be provided in a storage system these days, the settings for the storage system can be complicated and incorrect setting can easily occur. Conventionally, a maintenance person has had to manually configure the settings for the second storage system (replica storage system), which might lead to failures in data migration due to incorrect settings.

In light of these circumstance, reference 1 discloses a technique that solves remote operation difficulty resulting from the necessity of physically performing switching of access paths associated with data migration, and that reduces data migration failures resulting from incorrect settings for a replica storage system unit that requires input of complicated settings (see reference: JP2004-102374A).

In the data migration processing described above, various settings for an original storage system (e.g., settings for the configuration of volumes and for the connection relationship between the volumes and a host system) are adopted in a replica storage system, and then data in the original storage system is adopted in the replica storage system. Then the access path from the host system is switched from the original storage system to the replica storage system after this data migration processing.

Management software for managing the status and performance of the storage system periodically acquires configuration information and performance information from the storage system as a monitoring target and accumulates the acquired information in its internal database. The management software displays the accumulated configuration information and performance information in response to a request from an administrator. The performance information may be the amount of data received or transmitted per unit time for each device (component) such as a volume port in the monitoring target storage system.

When the administrator performs performance monitoring using the management software, the administrator sets in advance a threshold value for a device as a monitoring target. When, for example, the amount of data read from or written to a certain volume by a host computer exceeds the threshold value, the management software reports the administrator that the amount of read/written data exceeds the threshold value via e-mail or the like in order to alert the administrator.

However, when the above-described data migration processing is performed between two storage systems and a path between the host computer and an original storage system is shifted to a replica storage system, the administrator needs to re-set threshold values, which have been assigned to the devices in the original storage system, in the replica storage system in order to continuously perform the performance monitoring for the replica storage system. It is a first object to prevent the occurrence of that event.

In the situation where storage system configuration information and data are migrated from the original storage system to the replica storage system and the management software monitors the replica storage system, if there is a change in performance between the pre-migration and post-migration devices (components) (e.g., volumes or ports), the assigned threshold value may no longer be appropriate for the post-migration device performance. In other words, even though the threshold value was set based on the performance of a device, the device performance changes without being noticed by the administrator, and so the threshold may lose its original function. It is a second object to prevent the occurrence of that event.

Furthermore, in the situation where data is migrated from the original storage system to the replica storage system and the management software monitors the replica storage system, if there is a change in configuration between the original storage system and the replica storage system, the assigned threshold value may no longer be appropriate for the configuration of the replica storage system. In other words, even though the threshold was set based on the storage system configuration of the original storage system, the storage system configuration changes without being noticed by the administrator, and so the threshold may lose its original function. It is a third object to prevent the occurrence of that event.

SUMMARY

This invention was made in consideration of the above objects and proposes a computer system, a management apparatus and a management method that are capable of improving user friendliness and improving the reliability of storage systems.

In order to achieve the above objects, provided according to an aspect of this invention is a computer system that includes: a first storage system including devices that are various components required for storing data transmitted from a host computer; a second storage system that is connected to the first storage system via a network and includes devices that are various components required for storing data transmitted from the first storage system; and a management apparatus that is connected to the first and second storage systems via a network and manages the first and second storage systems, in which the management apparatus includes: a storage unit for storing configuration information, performance information and threshold values used for performance management regarding the devices in the first and second storage systems connected to the management apparatus; and a setting unit that adopts and sets, when internal management information and data are copied from the first storage system to the second storage system, the threshold values assigned to the devices in the first storage systems to the devices in the second storage systems.

Provided according to another aspect of this invention is a management apparatus that manages a first storage system including devices that are various components required for storing data transmitted from a host computer and a second storage system including devices that are various components required for storing data transmitted from the first storage system, the management apparatus including: a storage unit that stores configuration information, performance information and threshold values used for performance management regarding the devices in the first and second storage systems; and a setting unit that adopts and sets, when internal management information and data are copied from the first storage system to the second storage system, the threshold values assigned to the devices in the first storage system to the devices in the second storage systems.

Provided according to another aspect of this invention is a management method for a management apparatus that manages a first storage system including devices that are various components required for storing data transmitted from a host computer and a second storage system including devices that are various components required for storing data transmitted from the first storage system, the method including: a first step of storing in a storing unit configuration information, performance information and threshold values used for performance management regarding the devices in the first and second storage systems; and a second step in which a setting unit adopts and sets, when internal management information and data are copied from the first storage system to the second storage system, the threshold values assigned to the devices in the first storage system to the devices in the second storage systems.

Accordingly, the threshold values that have been assigned by an administrator to the devices in the first storage system (original storage system) can be automatically set in the second storage system (replica storage system) without re-setting the threshold values in the second storage system (replica storage system).

The above arrangements of this invention can realize a computer system, a management apparatus and a management method that are capable of improving user friendliness and improving the reliability of the storage systems.

Other aspects and advantages of the invention will be apparent from the following description and the appended claims.

BRIEF DESCRIPTION OF THE DRAWINGS

FIG. 7 is a diagram showing an example of the configuration of a volume list stored in the storage system in this invention.

FIG. 8 is a diagram showing an example of the configuration of a RAID group list stored in the storage system in this invention.

FIG. 9 is a diagram showing an example of the configuration of an I/O port list stored in the storage system in this invention.

FIG. 10 is a diagram showing an example of the configuration of a device model list stored in the storage system in this invention.

FIG. 11 is a diagram showing an example of the configuration of a storage basic information list stored in the storage system in this invention.

FIG. 12 is a diagram showing an example of the configuration a storage system performance list stored in the management computer in this invention.

FIG. 13 is a diagram showing an example of the configuration of storage pair configuration list stored in the storage management computer in this invention.

FIG. 14 shows an example of a screen displayed on the management computer in this invention.

FIG. 15 shows an example of a screen displayed on the storage management computer in this invention.

FIG. 18 is a diagram showing an example of the configuration of a storage system performance list stored in the management computer in embodiment 2.

FIG. 19 is a diagram showing an example of the configuration of a device pair list stored in the management computer in embodiment 2.

FIG. 20 is a diagram showing an example of the configuration of a device performance list stored in the management computer in embodiment 2.

FIG. 21 is a diagram showing an example of the configuration of a threshold re-calculation policy list stored in the management computer in embodiment 2.

DETAILED DESCRIPTION OF PREFERRED EMBODIMENTS

An embodiment of this invention will be described in detail with reference to the attached drawings.

(1) Embodiment 1

In embodiment 1, the below description will describe a method where data migration processing has been performed between two storage systems having the same physical configuration such as magnetic disks, a controller and an I/O port, for automatically adopting threshold values assigned to internal devices in an original storage system to those in a replica storage system.

FIGS. 1 to 6 show the configuration of a computer system 1 and the configurations of apparatuses connected to the computer system 1, while FIGS. 7 to 15 show management information or management screens included in each of the apparatuses.

Figure 1:
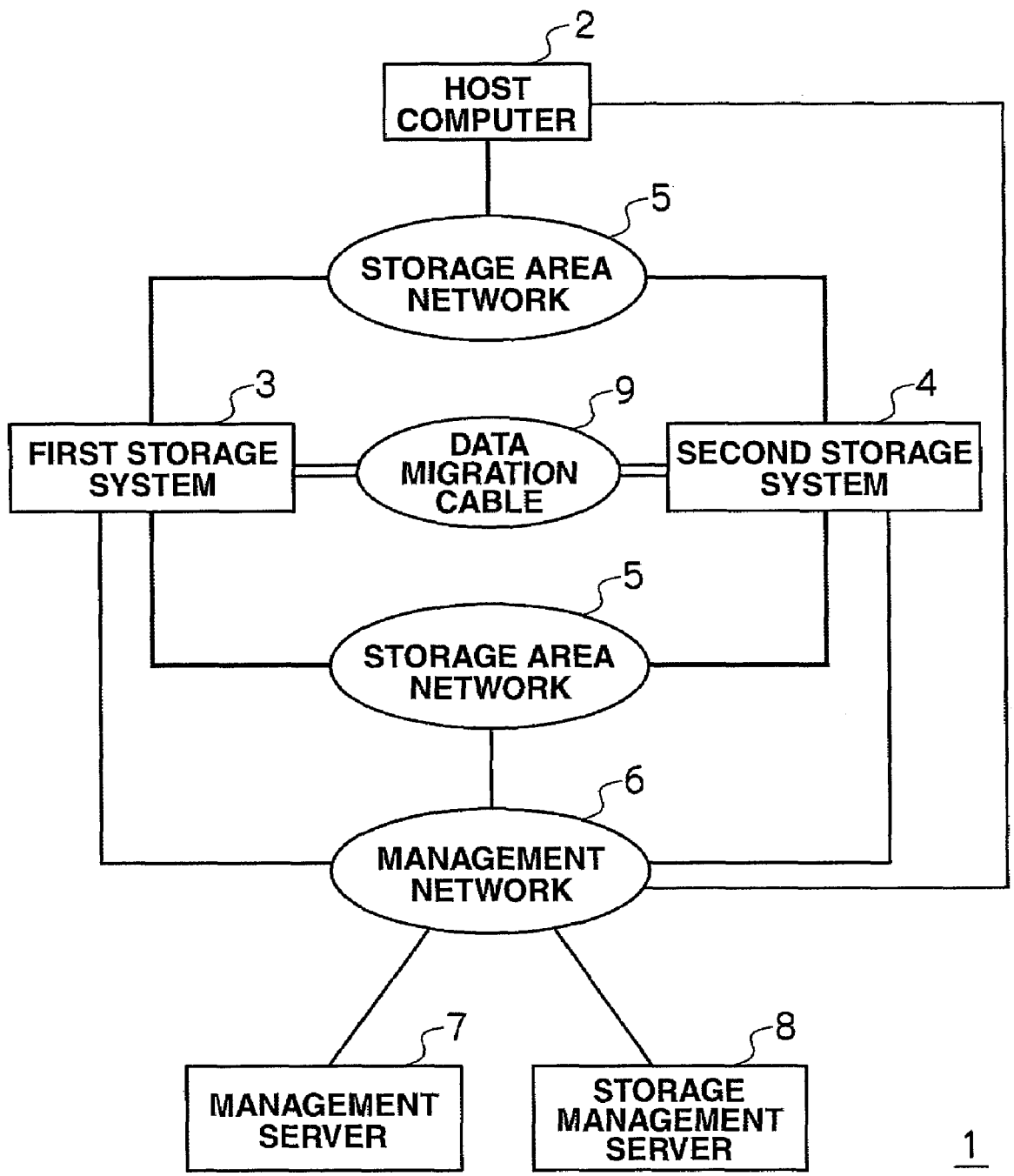
FIG. 1 is a diagram showing an example of the physical configuration of a computer system in this invention.

FIG. 1 shows the configuration of the computer system 1. In the computer system 1, a host computer 2, a first storage system 3 and a second storage system 4 are connected to each other via a storage area network (SAN) 5. Also, the host computer 2, the first storage system 3 and the second storage system 4 are connected to a management computer 7 and a storage management computer 8 via a management network 6. Here, the storage area network 5 and the management network 6 may be the same network. The first storage system 3 and the second storage system 4 are connected to each other via a data migration cable 9.

Figure 2:
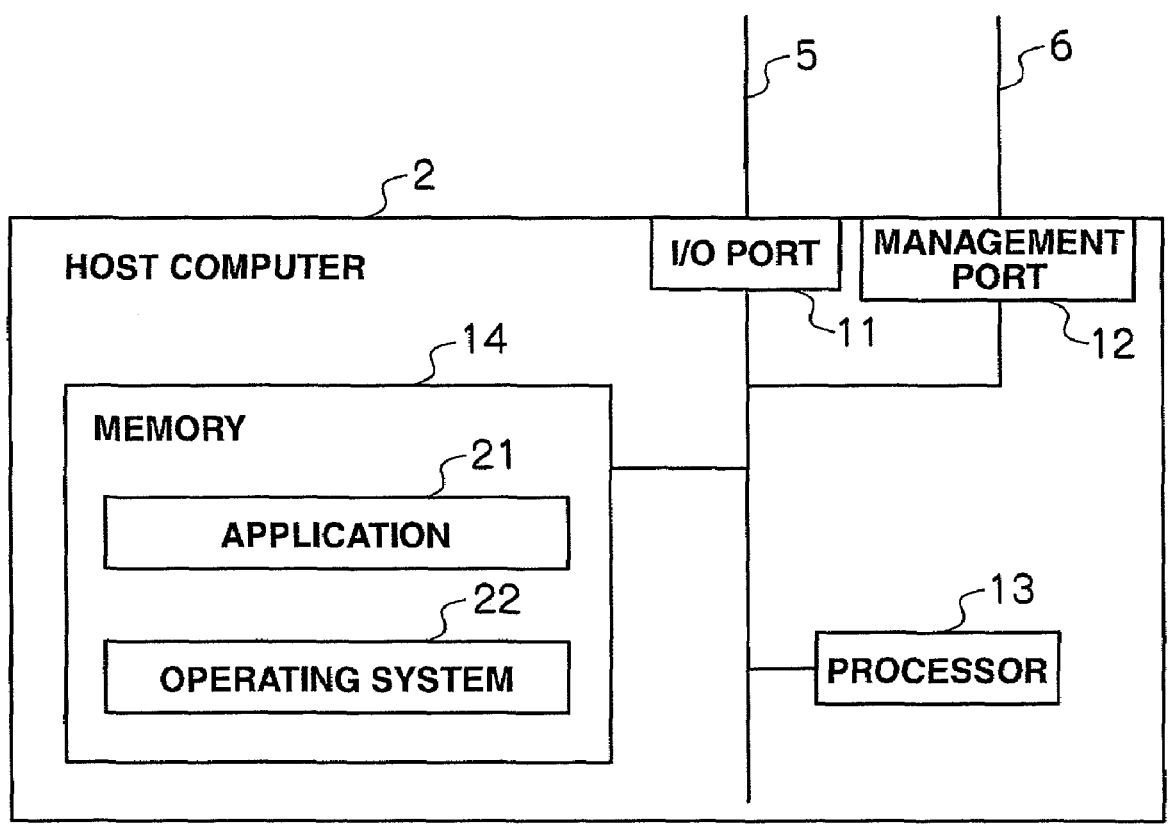
FIG. 2 is a diagram showing an example of the detailed configuration of a host computer in this invention.

FIG. 2 shows a detailed configuration example of the host computer 2. The host computer 2 includes an I/O port 11 for connecting the host computer 2 to the storage area network 5, a management port 12 for connecting the host computer 2 to the management network 6, a processor 13 and a memory 14, and these components are connected to each other via a circuit such as an internal bus. The memory 14 stores an operation application 21 and an operating system 22.

The operation application 21 uses a storage area provided by the operating system 22 and performs data input/output (hereinafter referred to as I/O) in relation to the storage area.

The operating system 22 makes the operation application 21 recognize volumes (to be described later) in the first and second storage systems 3 and 4 connected to the host computer 2 via the storage area network 5 as being storage areas.

Figure 3:
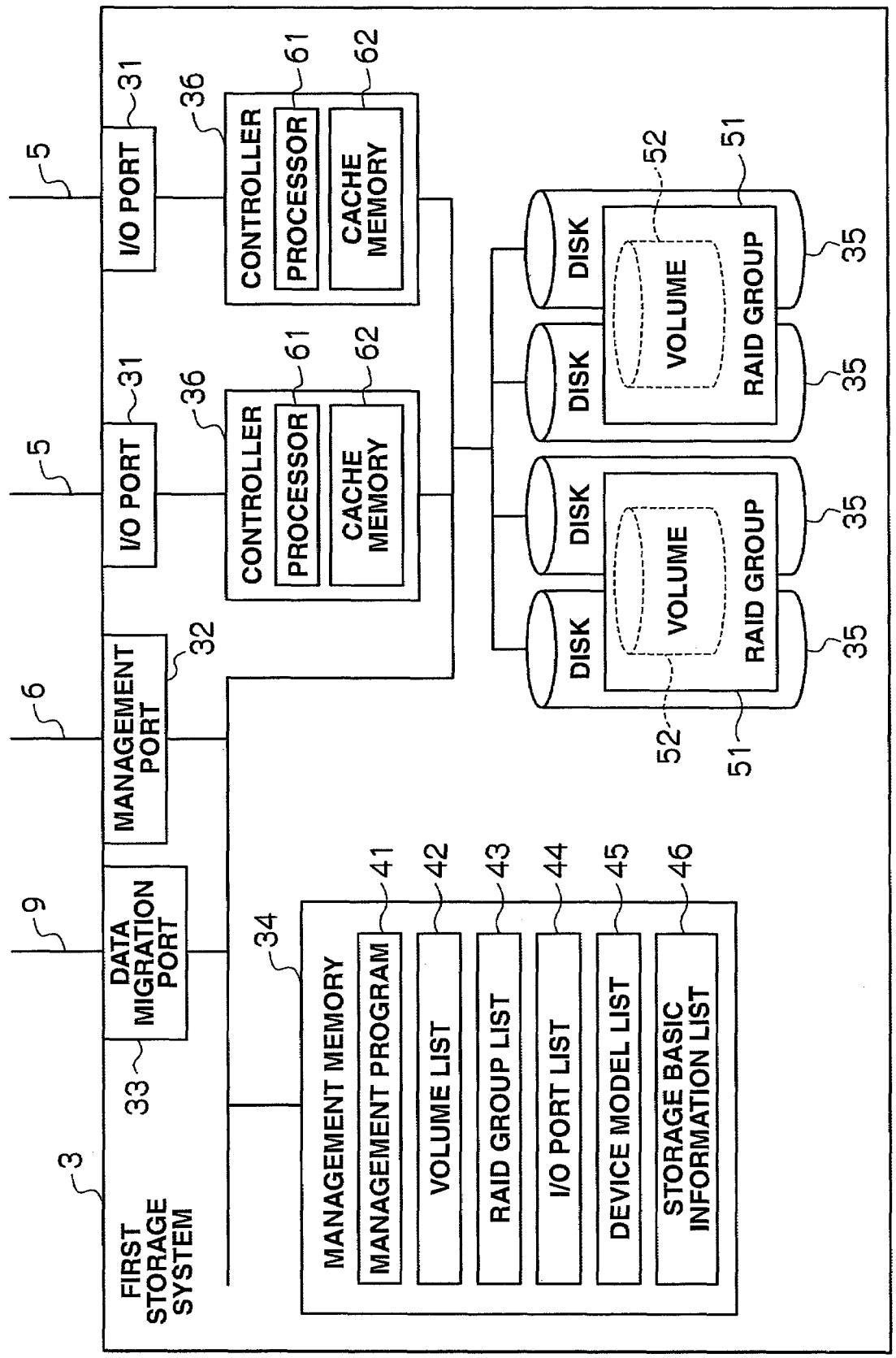
FIG. 3 is a diagram showing an example of the detailed configuration of a storage system in this invention.

FIG. 3 shows a detailed configuration example of the first storage system 3. The first storage system 3 includes: I/O ports 31 for connecting the first storage system 3 to the host computer 2 via the storage area network 5; a management port 32 for connecting the first storage system 3 to the management network 6; a data migration port 33 for connecting the first storage system 3 to another storage system via the data migration cable 9; a management memory 34 for storing various types of management information; magnetic disks 35 for storing data; and controllers 36 for controlling the data or the management information in the management memory, and these components are connected to each other via a circuit such as an internal bus.

The management memory 34 stores a management program 41, a volume list 42, a RAID group list 43, an I/O port list 44, a device model list 45 and a storage basic information list 46 for the first storage system 3.

One or a plurality of magnetic disks 35 defines a RAID (Redundant Arrays of Independent Disks) group 51. When the plurality of magnetic disks 35 defines the RAID group 51, these magnetic disks 35 may have RAID configurations such as RAID 1 and RAID 5. The RAID group 51 is logically divided into a plurality of volumes 52.

The controller 36 internally includes a processor 61 for controlling the first storage system 3 and a cache memory 62 for temporarily storing data exchanged between the first storage system 3 and the host computer 2. The controller 36 is provided between the I/O port 31 and the magnetic disk 35 and exchanges data between them.

The second storage system 4 has a configuration similar to the first storage system 3 described above.

Figure 4:
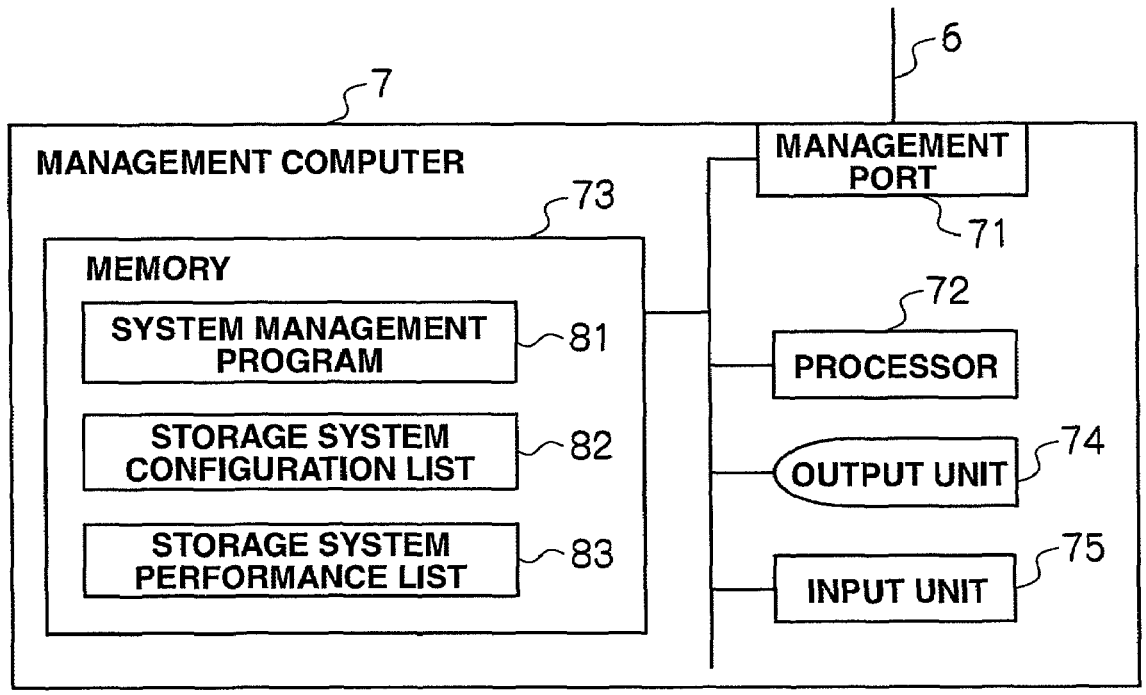
FIG. 4 is a diagram showing an example of the detailed configuration of a management computer in this invention.

FIG. 4 shows an example of the detailed configuration of the management computer 7. The management computer 7 includes a management port 71 for connecting the management computer 7 to the management network 6, a processor 72, a memory 73, an output unit 74 such as a display unit for outputting a processing result (to be described later) and an input unit 75 such as a keyboard that allows a management computer 7 administrator to perform input operation, and these components are connected to each other using a circuit such as an internal bus.

The memory 73 stores a system management program 81, a storage system configuration list 82 and a storage system performance list 83.

The system management program 81 periodically acquires configuration information and performance information from each of the first and second storage systems 3 and 4 and stores them respectively in the storage system configuration list 82 and the storage system performance list 83. Also, the system management program 81 displays the acquired configuration information and performance information on the output unit 74, while receiving threshold settings used for performance management for devices as management targets via the input unit 75, in response to a request from the administrator.

The storage system configuration list 82 stores the configuration information acquired from each of the first and second storage systems 3 and 4, e.g., volume lists 42 in the storage systems 3 and 4.

The storage system performance list 83 stores the performance information of the devices included in the first and second storage systems 3 and 4 and threshold values assigned to the devices.

Figure 5:
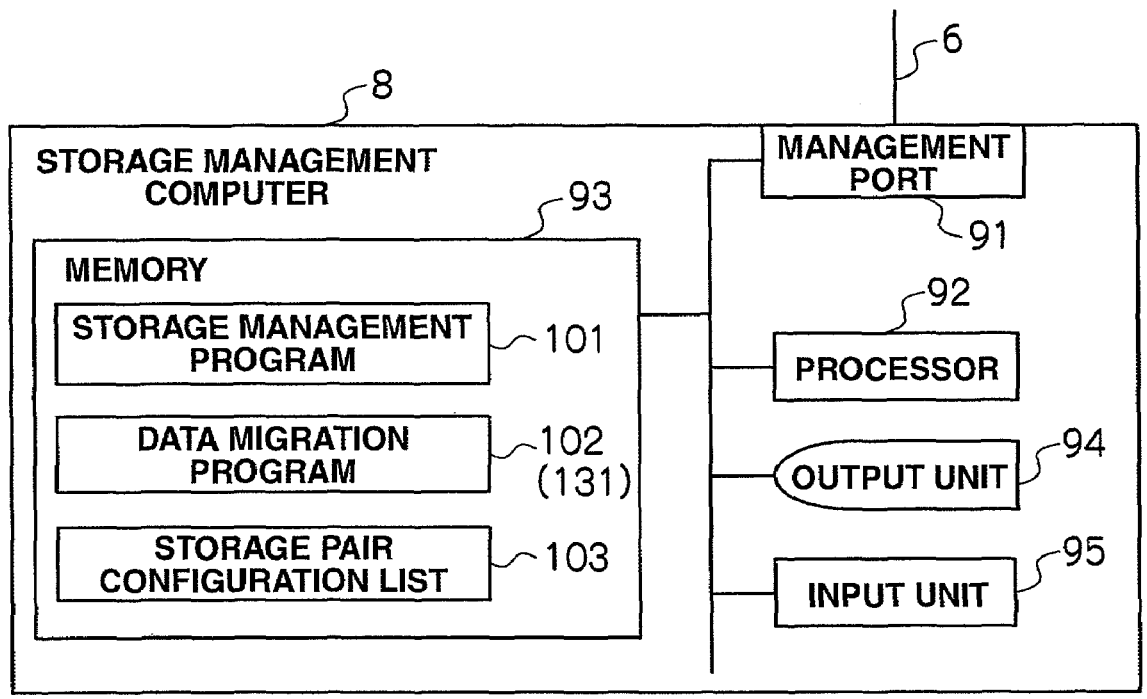
FIG. 5 is a diagram showing an example of the detailed configuration of a storage management computer in this invention.

FIG. 5 shows a detailed configuration example of the storage management computer 8. The storage management computer 8 includes a management port 91 for connecting the storage management computer 8 to the management network 6, a processor 92, a memory 93, an output unit 94 such as a display unit for outputting a processing result (to be described later) and an input unit 95 such as a keyboard for allowing an administrator of the storage management computer 8 (hereinafter referred to as a storage administrator) to input commands, and these components are connected to each other via a circuit such as an internal bus.

The memory 93 stores a storage management program 101, a data migration program 102 and a storage pair configuration list 103.

The storage management program 101 acquires the configuration information from each of the first and second storage systems 3 and 4 in response to a request from the administrator, displays the acquired information on the output unit 94 for the storage administrator, transmits the configuration information to the management computer 7 and stores the information respectively in the storage system configuration list 82 and the storage system performance list 83.

The data migration program 102 receives data migration processing request for data migration between the first and second storage systems 3 and 4 from the storage administrator via the input unit 95.

Figure 6:
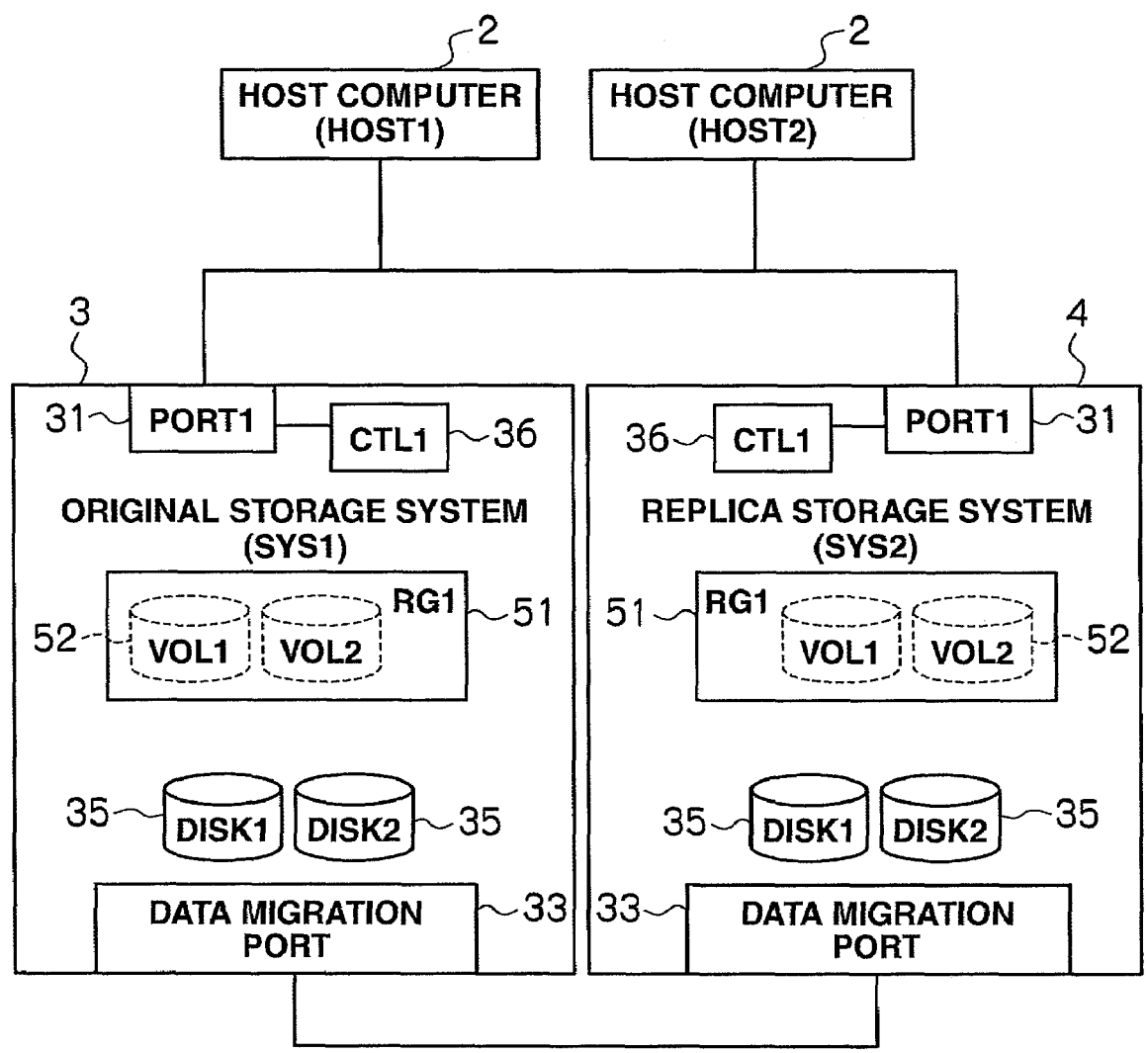
FIG. 6 is a diagram showing an example of the logical configuration of a computer system in this invention.

FIG. 6 shows a storage system configuration that includes the host computer 2 and the first and second storage systems 3 and 4 that are performing the data migration processing. In this embodiment, the first and second storage systems 3 and 4 have the same physical configuration including the magnetic disks, the controller and the I/O port.

The first storage system 3 (original storage system (SYS1)) and the second storage system 4 (replica storage system (SYS2)) are connected to the host computers 2 (HOST1, HOST2) via the storage area networks 5. The first storage system 3 (SYS1) is connected to the second storage system 4 (SYS2) via the data migration cable 9.

The volumes 52 (VOL1, VOL2) in the first storage system 3 (SYS1) correspond respectively to the volumes 52 (VOL1, VOL2) in the second storage system 4 (SYS2). Likewise, the RAID group 51 (RG1) in the first storage system 3 (SYS1) corresponds to the RAID group (RG1) in the second storage system 4 (SYS2), the controller 36 (CTL1) in the first storage system 3 (SYS1) corresponds to the controller 36 (CTL1) in the second storage system 4 (SYS2), and the I/O port 31 (PORT1) in the first storage system 3 (SYS1) corresponds to the I/O port 31 (PORT1) in the second storage system 4 (SYS2).

FIG. 7 shows the volume list 42 stored in the first and second storage systems 3 and 4. The volume list 42 includes: a volume ID field 42A for entering the volume ID, which is the identifier of each volume 52 in the first and second storage systems 3 and 4; a connected host ID field 42B for entering the connected host ID, which is the identifier of a host computer 2 that is a connection target for each volume 52; a capacity field 42C for entering the capacity of each volume 52; and a RAID group ID field 42D for entering the RAID group ID, which is the identifier of a RAID group 51 in which each volume 52 is provided.

FIG. 7 shows an example of specific values in the volume list 42 stored in the first and second storage systems 3 and 4. For example, the volume 52 having the volume ID "VOL1" in the first storage system 3 is permitted to connect to the host computer 2 having the connected host ID "HOST 1," and this volume 52 is defined by a storage area having the capacity of "20 (Gbytes)" in the RAID group 51 having the RAID group ID "RG1."

FIG. 8 shows the configuration of the RAID group list 43 stored in the first and second storage systems 3 and 4. The RAID group list 43 includes: a RAID group ID field 43A for entering the RAID group ID, which is the identifier of each RAID group 51 in the first and second storage systems 3 and 4; a RAID level field 43B for entering the RAID level of each RAID group 51; a magnetic disk ID field 43 for entering a disk ID, which is the identifier of a magnetic disk 35 that defines each RAID group 51; and a capacity field 43D for entering the capacity of each RAID group 51.

FIG. 8 shows an example of specific values in the RAID group list 43 stored in the first and second storage systems 3 and 4. For example, the RAID group 51 having the RAID group ID "RG1" in the first storage system 3 is defined by the magnetic disks 35 having the disk IDs "DISK1" and "DISK2," and its RAID level is "RAID1" and its capacity is "100 (Gbytes)."

It should be noted that although this embodiment assumes that all the magnetic disks 35 defining a RAID group 51 are of the same model, the RAID group 51 may actually be defined by magnetic disks 35 of different models.

FIG. 9 shows the configuration of the I/O port list 44 stored in the first and second storage systems 3 and 4. The I/O port list 44 includes: a port ID field 44A for entering the port ID, which is the identifier of each I/O port 31 in the first and second storage systems 3 and 4; an IP address field 44B for entering the IP address of each I/O port 31; a subnet mask field 44C for entering the subnet mask of each I/O port 31; a default gateway field 44D for entering the default gateway of each I/O port 31; and a volume field 44E for entering the volume ID, which is the identifier of a volume 52 that is connected to the host computer 2 via each I/O port 31.

FIG. 9 shows an example of specific values in the I/O port list 44 stored in the first and second storage systems 3 and 4. For example, the I/O port 31 having the port ID "PORT1" in the first storage system 3 has been assigned the IP address "11.11.11.11," the subnet mask "255.255.255.0" and the default gateway "11.11.11.1," and the volumes 52 having the volume IDs "VOL1, VOL2, VOL3, VOL4" are connected to the host computer 2 via this I/O port 31.

FIG. 10 shows the configuration of a device model list 45 stored in the first and second storage systems 3 and 4. The device model list 45 includes: a device ID field 45A for entering the device ID, which is the identifier of a device such as the controller 36 and the RAID group 51 in the first and second storage systems 3 and 4; and a model ID field 45B for entering the model ID, which is the identifier of a physical model of each device.

FIG. 10 shows an example of specific values in the device model list 45 stored in the first and second storage systems 3 and 4. For example, the controller 36 having the device ID "CTL1" in the first storage system 3 is the model (controller 36) having the model ID "CTL-1," and the I/O port 31 having the port ID "PORT1" is connected to the host computer 2 via this controller 36. Also, for example, the RAID group 51 having the RAID group ID "RG1" in the first storage system 3 is a model (magnetic disk 35) having the model ID "DISK-1."

FIG. 11 shows the configuration of the storage basic information list 46 stored in the first and second storage systems 3 and 4. The storage basic information list 46 includes: a storage ID field 46A for entering the storage ID, which is the identifier used when the host computer 2, the management computer 7 or the storage management computer 8 refers to the first and second storage systems 3 and 4; an IP address field 46B for entering the IP address of the management port 32 of the relevant first or second storage system 3 or 4; a subnet mask field 46C for entering the subnet mask of the relevant management port 32; and a default gateway field 46D for entering the default gateway of the relevant management port 32.

FIG. 11 shows an example of specific values in the storage basic information list 46 stored in the first and second storage systems 3 and 4. For example, the first storage system 3 having the storage ID "SYS1" has the management port 32 with its IP address set to "11.11.11.21," its subnet mask set to "255.255.255.0" and its default gateway set to "11.11.11.1."

FIG. 12 shows the configuration of the storage system performance list 83 stored in the management computer 7. The storage system performance list 83 includes a storage ID field 83A for entering the storage ID, which is the identifier of the first or second storage system 3 or 4 to which the device to be managed (management target device) belongs; a device ID field 83B for entering the device ID, which is the identifier of the relevant management target device; a metric field 83C for entering the metric name of the performance information for the relevant management target device; a performance value field 83D for entering the performance value of the relevant management target device that has been acquired from the relevant first or second storage system 3 or 4; and an alert threshold value field 83E for storing a threshold value of alert in response to an input from the administrator.

If the I/O amount per unit time for a management target device exceeds the threshold value, the management computer 7 gives an alert to the administrator using an e-mail or similar.

FIG. 12 shows an example of specific values in the storage system performance list 83 stored in the management computer 7. For example, the I/O amount per unit time for the RAID group 51 having the RAID group ID "RG1" in the first storage system 3 having the storage ID "SYS1" is currently "40." If the I/O amount per unit time for the RAID group 51 having the RAID group ID "RG1" exceeds "100," the management computer 7 gives an alert to the administrator.

Although the performance value of the device managed by the management computer 7 employs the I/O amount per unit time and the operation rate in the above example, the performance value managed by the management computer 7 may also be other values.

FIG. 13 shows the configuration of the storage pair configuration list 103 stored in the storage management computer 8. The storage pair configuration list 103 includes: an original storage system ID field 103A for entering the original storage system ID, which is the identifier of the first storage system 3 serving as an original storage system for migrated data in the data migration processing; an original storage system's device ID field 103B for entering the original storage system's device ID, which is the identifier of a device included in the first storage system (original storage system) 3; a replica storage system ID field 103C for entering the replica storage system ID, which is the identifier of the second storage system 4 serving as a replica storage system in the data migration processing; and a replica storage system's device ID field 103D for entering the replica storage system's device ID, which is the identifier of a device included in the second storage system (replica storage system) 4 and paired with the relevant device in the first storage system (original storage system) 3.

FIG. 13 shows an example of specific values in the device pair list 103 stored in the storage management computer 8. For example, the RAID group 51 having the RAID group ID "RG1" in the first storage system 3 having the storage ID "SYS1" corresponds to the RAID group 51 having the RAID group ID "RG1" in the second storage system 4 having the storage ID "SYS2."

FIG. 14 shows a display example of an alert threshold setting screen 111 that is displayed for the administrator on the management computer 7 when the administrator sets a performance management threshold for each device using the management computer 7. The alert threshold setting screen 111 includes: a setting target ID field 111A for specifying the device ID of a device for which the administrator tries to set a threshold; a threshold field 111B for specifying a threshold value for the device having the specified device ID; a metric field 111C for specifying the metric of the device having the specified device ID; a mail address field 111D for specifying an e-mail address to which a report is to be sent when the threshold value for the device having the specified device ID is exceeded; an execution button 111E that is clicked after confirming the specified parameters in order to set threshold value of alert; and a cancellation button 111F that is clicked in order to cancel the setting of the alert threshold value.

The administrator clicks the execution button 111E to set the alert threshold after specifying the setting target ID, the threshold value, the metric and the e-mail address, and the cancellation button 111F to cancel the setting of the threshold value of alert. When the execution button 111E is clicked, the system management program 81 in the management computer 7 stores the threshold value in the storage system performance list 83 in response to the threshold setting command from the administrator. On the other hand, when the cancellation button 111F is clicked, the system management program 81 in the management computer 7 terminates the processing without setting the threshold value.

FIG. 15 shows an example of the display of a data migration command screen 112 that is displayed for the storage administrator on the storage management computer 8 when the storage administrator commands the execution of the data migration processing between the first and second storage systems 3 and 4 using the storage management computer 8. The data migration command screen 112 includes: an original storage system ID field 112A for specifying the storage ID of the first storage system 3 serving as the original storage system in data migration; a replica storage system ID field 112B for specifying the storage ID of the second storage system 4 serving as the replica storage system in the data migration; an execution button 112C clicked after confirming the above specified parameters in order to set the data migration command; and a cancellation button 112D clicked in order to cancel the setting of data migration command.

The administrator clicks the execution button 112C to set the data migration command after specifying the original storage system ID and the replica storage system ID, and the cancellation button 112D to cancel the setting of the data migration command. When the execution button 112C is clicked, the storage management program 101 in the storage management computer 8 commands the first (original) storage system 3 and the second (replica) storage system 4 to start the data migration processing. On the other hand, when the cancellation button 112D is clicked, the storage management program 101 in the storage management computer 8 does not issue a command to the first (original) storage system 3 and the second (replica) storage system 4 and terminates the processing.

Figure 16:
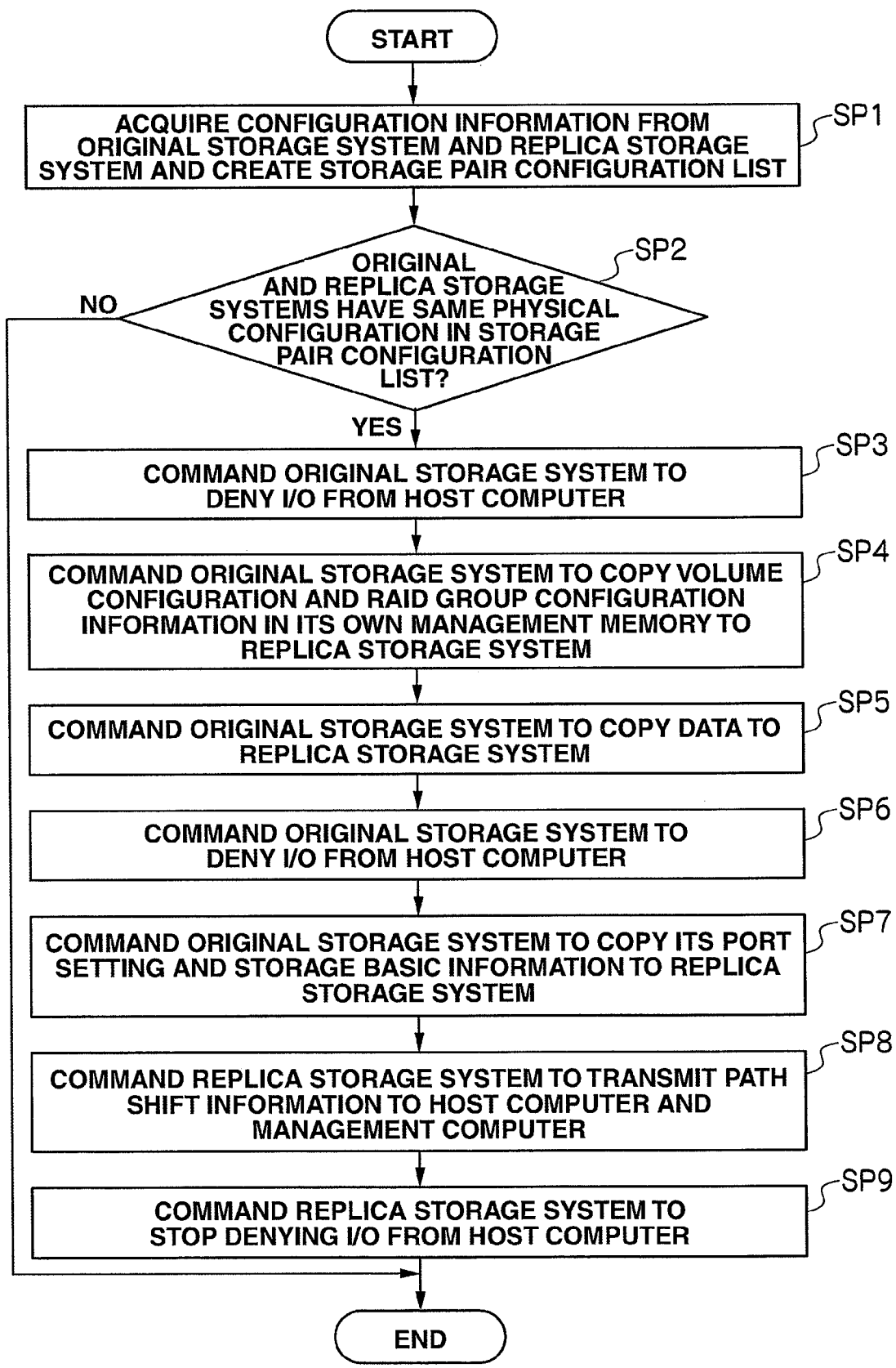
FIG. 16 is a flowchart showing the entire flow of data migration processing performed by the storage system in embodiment 1.

FIG. 16 shows a flowchart for the data migration processing included in the data migration program 102 in the storage management computer 8 in this embodiment.

It should be noted that although, in order to clearly describe the content of the operations performed by the processor 92 in the storage management computer 8, description will be given with the agent of each operation in the processing being the relevant program, it is obvious that the processor 92 actually performs each operation based on the relevant program.

When the start of data migration processing for migrating data from the first (original) storage system 3 to the second (replica) storage system 4 is commanded from the input unit 95 in the storage management computer 8 by the storage administrator, the data migration program 102 starts the data migration processing, acquires configuration information from each list in the first (original) storage system 3 and the second (replica) storage system 4 and creates the storage pair configuration list 103 (step SP1).

Next, the data migration program 102 refers to the storage pair configuration list 103 to check whether or not the first (original) storage system 3 and the second (replica) storage system 4 have the same physical configuration (i.e., the number of the controllers 36, I/O ports 31 and magnetic disks 35) (step SP2).

If they do not have the same physical configuration (step SP2: NO), the data migration processing cannot be performed, so the data migration program 102 terminates the processing. On the other hand, if they have the same physical configuration (step SP2: YES), the data migration program 102 commands the second (replica) storage system 4 to deny I/O from the host computer 2 (step SP3). The second (replica) storage system 4 configures the setting so as to deny the I/O from the host computer 2 based on the command from the storage management computer 8.

Then the data migration program 102 commands the first (original) storage system 3 to read configuration information for the RAID group 51 and the volume 52 in the management memory 34 included in the first (original) storage system 3 and to copy the read configuration information to the second (replica) storage system 4 (step SP4). The first (original) storage system 3 reads the configuration information for the RAID group 51 and the volume 52 in its own memory 34 based on the command from the storage management computer 8, and transmits the read configuration information to the second (replica) storage system 4. When receiving the configuration information for the RAID group 51 and the volume 52 from the first (original) storage system 3 based on the command from the storage management computer 8, the second (replica) storage system 4 sets the received configuration information in its own memory 34, and transmits a completion report to the storage management computer 8. Note that the configuration information read in this step includes the volume list 42 and the RAID group list 43.

After the settings for the configuration of the RAID group 51 and the volume 52 are complete in the second (replica) storage system 4 and the completion report is received, the data migration program 102 issues a command to copy data in the first (original) storage system 3 to the second (replica) storage system 4 (step SP5). The first (original) storage system 3 transmits the data stored in the magnetic disk 35 to the second (replica) storage system 4 based on the command from the storage management computer 8. When receiving the data from the first (original) storage system 3 based on the command from the storage management computer 8, the second (replica) storage system 4 stores the received data in the corresponding magnetic disk 35 and transmits a completion report to the storage management computer 8.

Next, when the data copy in the second (replica) storage system 4 is complete and the completion report is received, the data migration program 102 commands the first (original) storage system 3 to deny I/O from the host computer 2 (step SP6). The first (original) storage system 3 configures the settings so as to deny the I/O from the host computer 2 based on the command from the storage management computer 8.

Next, the data migration program 102 reads the configuration information about basic information for the I/O port 31 and for the first (original) storage system 3, which are stored in the management memory 34 in the first (original) storage system 3, and commands the first (original) storage system 3 to copy the read configuration information to the second (replica) storage system 4 (step SP7). The first (original) storage system 3 reads the configuration information about the basic information for the I/O port 31 and for the first (original) storage system 3 itself, which is stored in its own management memory 34, based on the command from the storage management computer 8, and transmits the read information to the second (replica) storage system 4. When receiving the configuration information about the basic information for the I/O port 31 and for the first (original) storage system 3 from the first (original) storage system 3 based on the command from the storage management computer 8, the second (replica) storage system 4 sets the received configuration information in its own management memory 34 and transmits a completion report to the storage management computer 8. The configuration information read in this step includes the I/O port list 44 and the storage basic information list 46.

When the settings for the configuration information about the basic information for the I/O port 31 and for the first (original) storage system 3 are complete in the second (replica) storage system 4 and the completion report is received, the data migration program 102 commands the second (replica) storage system 4 to transmit the IP address of the I/O port 31 that performs I/O in relation to the host computer 2, the management computer 7 or a node including a rooter via the I/O port 31 and the management port 32, and its corresponding MAC address (path shift information (step SP8). The second (replica) storage system 4 transmits the IP addresses of the I/O port 31 and the management port 32 that respectively perform I/O and management in relation to the host computer 2, the management computer 7 or the node including the rooter via the I/O port 31 and the management port 32 and their corresponding MAC addresses based on the command from the storage management computer 8, and then transmits a completion report to the storage management computer 8.

When the data migration program 102 transmits the IP address of the I/O port 31 for performing the I/O and its corresponding MAC address and receives the completion report, the data migration program 102 commands the second (replica) storage system 4 to stop denying the I/O from the host computer 2 (step SP9). The second (replica) storage system 4 stops denying the I/O from the host computer 2 based on the command from the storage management computer 8, and transmits the completion report to the storage management computer 8. As a result, communication from the host computer 2 or the management computer 7 to the second (replica) storage system 4 is started.

In this embodiment, the situation in which the storage ID of the first (original) storage system 3 is adopted in the second (replica) storage system 4 in the process of data migration process from the first (original) storage system 3 to the second (replica) storage system 4 has been described above. However, the storage ID of the first (original) storage system 3 may not be adopted in the second (replica) storage system 4. In that case, a possible arrangement that can be employed would be as follows: the management computer 7 acquires the storage ID of the first (original) storage system 3 and the storage ID of the second (replica) storage system 4 from the storage management computer 8 and changes the storage ID in the storage system performance list 83 from the storage ID of the first (original) storage system 3 to that of the second (replica) storage system 4.

In this embodiment, an example in which the data migration from the first (original) storage system 3 to the second (replica) storage system 4 is started based on the storage administrator's command has been described. However, in actuality, the configuration information and data are constantly synchronized between the first (original) storage system 3 and second (replica) storage system 4, and I/O to the first (original) storage system 3 may be switched to the second (replica) storage system 4 when, for example, a failure occurs in the first (original) storage system 3. In that case, a possible arrangement that can be employed would be as follows: the management computer 7 acquires the storage ID of the first (original) storage system 3 and the storage ID of the second (replica) storage system 4 from the storage management computer 8 and changes the storage ID in the storage system performance list 83 from the storage ID of the first (original) storage system 3 to that of the second (replica) storage system 4.

As described above, in this embodiment, when data migration from the first (original) storage system 3 to the second (replica) storage system 4 is performed, the storage ID assigned to the first (original) storage system 3, the device IDs assigned to the internal devices and the IP addresses of the I/O ports 31 and the management port 32 are adopted in the second (replica) storage system 4. With the above arrangement, the administrator of the management computer 7 does not have to re-set the threshold values assigned to the devices in the first (original) storage system 3 to the second (replica) storage system 4.

(2) Embodiment 2

In embodiment 2, the below description will describe a method for adopting a threshold value assigned to an internal device in the first (original) storage system 3 in the second (replica) storage system 4 in the situation where when data migration processing is performed between the first and second storage systems 3 and 4 having the same physical configuration such as the magnetic disks 35, the controller 36 and the I/O port 31 and there is a change in performance (model) between an internal device in the first (original) storage system 3 and the performance (model) of the corresponding internal device in the second (replica) storage system 4, the threshold value assigned to the relevant internal device in the first (original) storage system 3 is re-calculated based on the performance (model) of the corresponding internal device in the second (replica) storage system 4 and the re-calculated threshold value is adopted in the second (replica) storage system 4.

Figure 17:
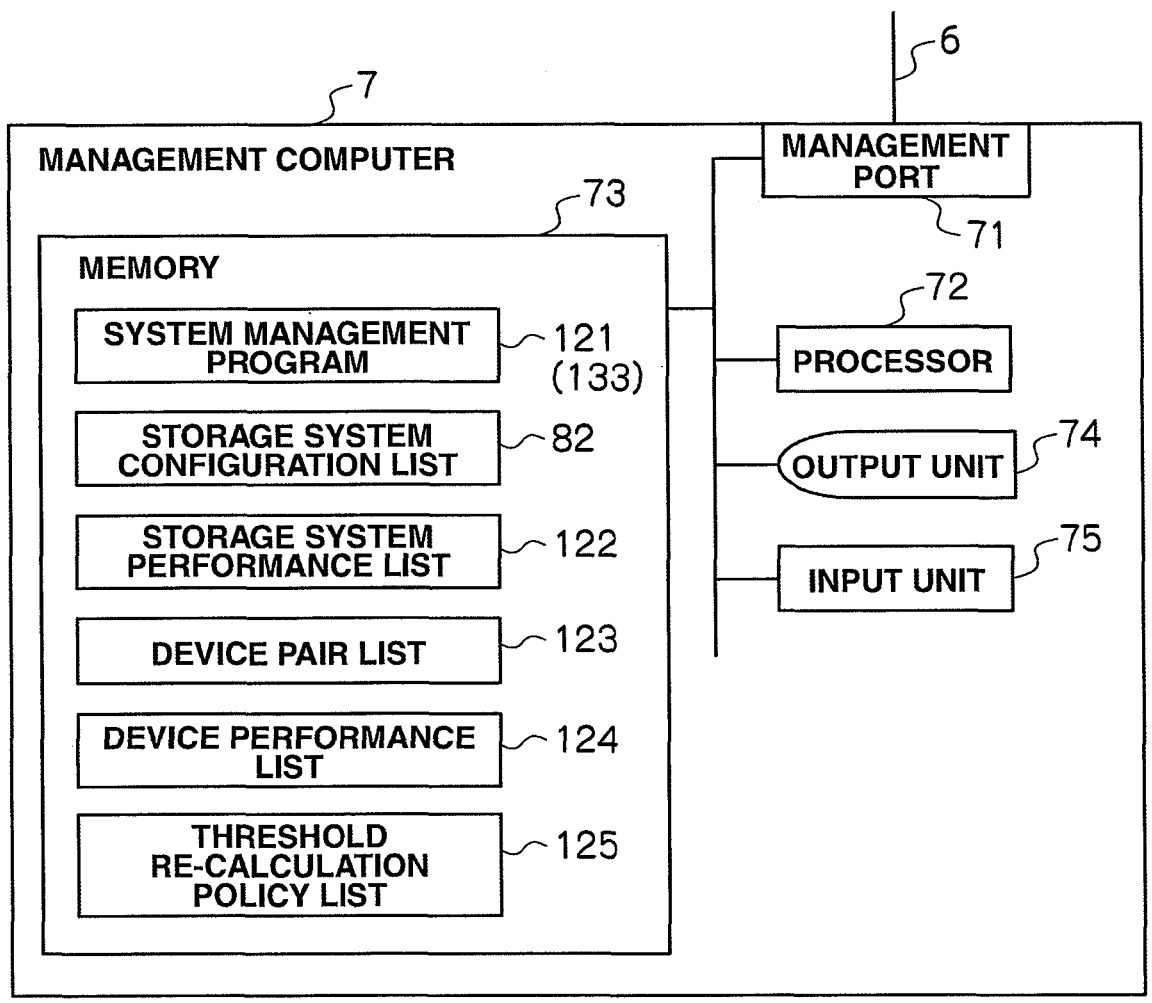
FIG. 17 is a diagram showing an example of the detailed configuration of a management computer in embodiment 2.

The configuration of the computer system 1 after applying threshold re-calculation processing by the management computer 7 to the configuration in embodiment 1 will be described. FIG. 17 shows the configuration of the management computer 7, and FIGS. 18 to 21 each show management information stored in the management computer. It should be noted that the configurations of the host computer 2, the first and second storage systems 3 and 4 and the storage management computer 8 are same as those shown in FIGS. 2, 3 and 5.

FIG. 17 shows a detailed configuration example of the management computer 7. The configuration of the management computer 7 is same as that of the management computer 7 in embodiment 1 except that the memory 73 additionally stores a storage system performance list 122 shown in FIG. 18, a device pair list 123 shown in FIG. 19, a device performance list 124 shown in FIG. 20 and a threshold re-calculation policy list 125 shown in FIG. 21, and also stores a system management program 121 that additionally includes threshold re-calculation processing shown in FIGS. 23 and 24.

FIG. 18 shows the configuration of the storage system performance list 122 stored in the management computer 7. The storage system performance list 122 has the same configuration as the storage system performance list 83 in embodiment 1 described above, except that the storage system performance list 122 includes a threshold re-calculation flag field 122F for managing whether or not threshold re-calculation has been performed in the threshold re-calculation processing that will be described in this embodiment.

FIG. 19 shows the configuration of the device pair list 123 stored in the management computer 7. The device pair list 123 includes: an original storage system ID field 123A for entering the original storage system ID, which is the identifier of the first storage system 3 serving as an original storage system for migrated data in the data migration processing; an original storage system's device ID field 123B for entering the original storage system's device ID, which is the identifier of a device included in the first (original) storage system 3; a model ID field 123C for entering the model ID, which is the identifier of the physical model of the relevant device included in the first (original) storage system 3; a replica storage system ID field 123D for entering the replica storage system ID, which is the identifier of the second storage system 4 serving as the replica storage system in the data migration processing; a replica storage system's device ID field 123E for entering the replica storage system's device ID, which is the identifier of a device included in the second (replica) storage system 4; and a model ID field 123F for entering the model ID, which is the identifier of the physical model of the relevant device included in the second (replica) storage system 4.

FIG. 19 shows an example of specific values in the device pair list 123 stored in the management computer 7. For example, the RAID group 51 having the RAID group ID "RG1" in the first storage system 3 having the storage ID "SYS1" is the RAID group 51 that is defined by the magnetic disk 35 of the model having the model ID "DISK-1." The RAID group 51 having the RAID group ID "RG1" in the first storage system 3 having the storage ID "SYS1" corresponds to the RAID group 51 having the RAID group ID "RG1" in the second storage system 4 having the storage ID "SYS2." This RAID group 51 is defined by the magnetic disk 35 of the model having the model ID "DISK-2."

FIG. 20 shows the configuration of the device performance list 124 stored in the management computer 7. The device performance list 124 includes: a model ID field 124A for entering the model ID, which is the identifier of the physical model of each device included in the first and second storage systems 3 and 4; a device type field 124B for entering the type of each device; and a device performance field 124C for entering the performance of each device.

FIG. 20 shows an example of specific values in the device performance list 124 stored in the management computer 7. For example, concerning the RAID group 51 defined by the magnetic disk 35 of the model having the model ID "DISK-1," the revolution speed of the internal magnetic disk 35 is "100."

Although the clock speed and the revolution speed are employed as performance values for the devices managed by the management computer 7 in this embodiment, the performance value managed by the management computer 7 may be another value. In addition, a plurality of parameters may be entered for one device.

FIG. 21 shows the configuration of the threshold re-calculation policy list 125 stored in the management computer 7. The threshold re-calculation policy list 125 includes: a device type field 125A for entering the type of each device in the first and second storage systems 3 and 4; a performance value field 125B for entering the performance value the relevant device type can have; a threshold re-calculation necessity field 125C for entering whether or not a threshold value assigned to the relevant performance value needs to be changed in accordance with the performance of the relevant device; and a threshold re-calculation policy field 125D for entering the performance value that serves as a policy for obtaining re-calculation ratio when the threshold value is changed in accordance with the performance of the relevant device.

FIG. 21 shows an example of specific values in the threshold re-calculation policy list 125 stored in the management computer 7. For example, when the management computer 7 stores a threshold value for the I/O amount per unit time for the controller 36, this threshold value needs to be changed when the performance of this device is changed, and the above change should be based on the ratio of the revolution speed of the magnetic disk 35.

Figure 22:
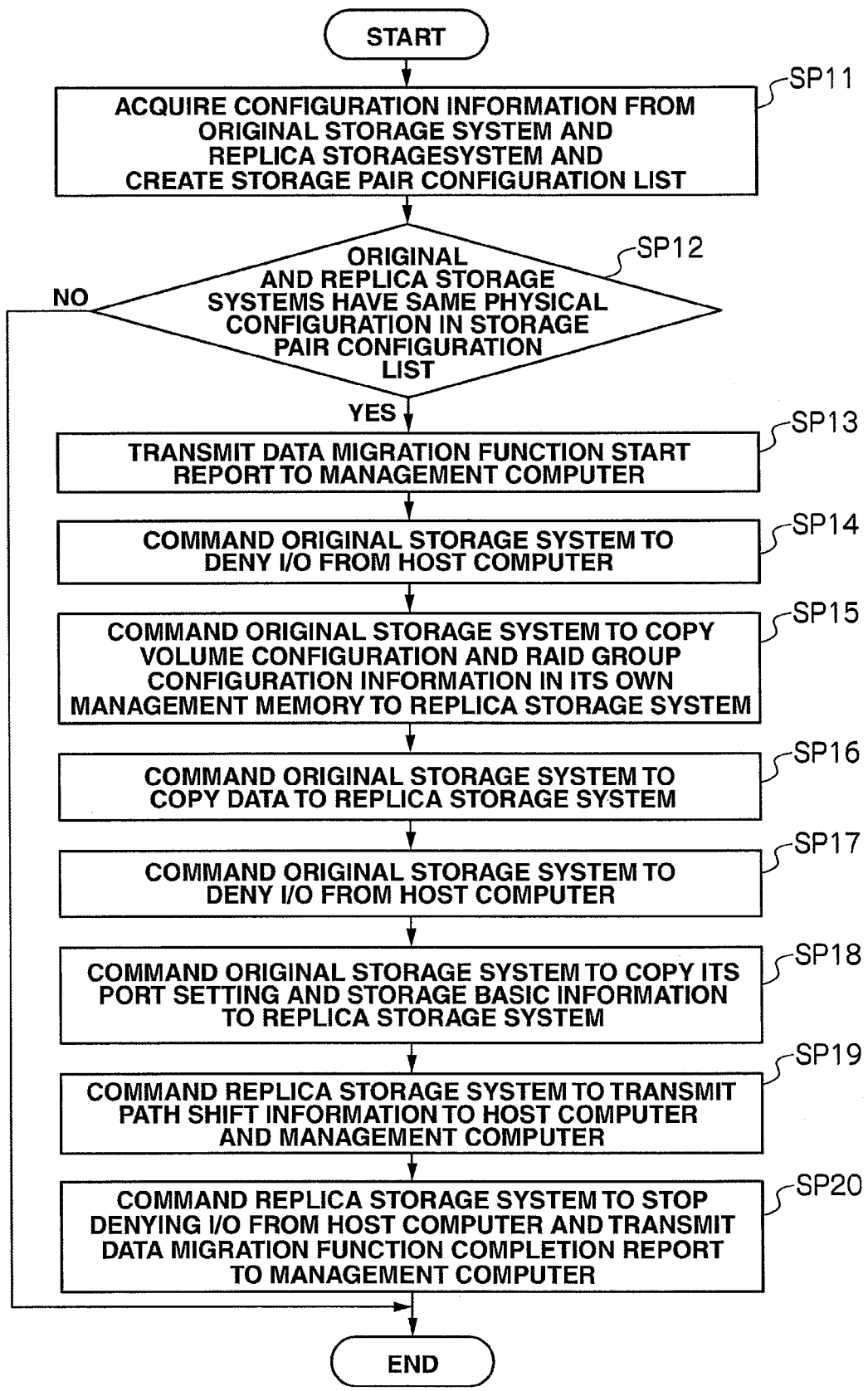
FIG. 22 is a flowchart showing an example of the entire flow of data migration processing performed by the storage system in embodiment 2.

FIG. 22 shows a flowchart for data migration processing stored in the data migration program 102 in the storage management computer 8.

If the first and second storage systems 3 and 4 have the same physical configuration (step SP12: YES), the data migration program 102 transmits to the management computer 7 a report that the data migration processing has started, and at the same time, transmits the storage ID of the first (original) storage system 3 and the storage ID of the second (replica) storage system 4 (step SP13), and then the data migration program 102 commands the management computer 7 to deny I/O from the host computer 2 (step SP14).

The data migration program 102 commands the second (replica) storage system 4 to transmit the IP address of the I/O port 31 that performs I/O in relation to the host computer 2, the management computer 7 or a node including a rooter via the I/O port 31 and the management port 32, and its corresponding MAC address (path shift information) (step SP19). Then the data migration program 102 commands the second (replica) storage system 4 to stop denying I/O from the host computer 2 and transmits the management computer 7 a report reporting that the data migration processing is complete (step SP20).

The operations in steps SP11, 12 and 14 to 19 (i.e., steps other than the above-described steps) are same as the operations in steps SP1, SP2 and SP3 to SP9 in FIG. 16 in embodiment 1 described above.

Figure 23:
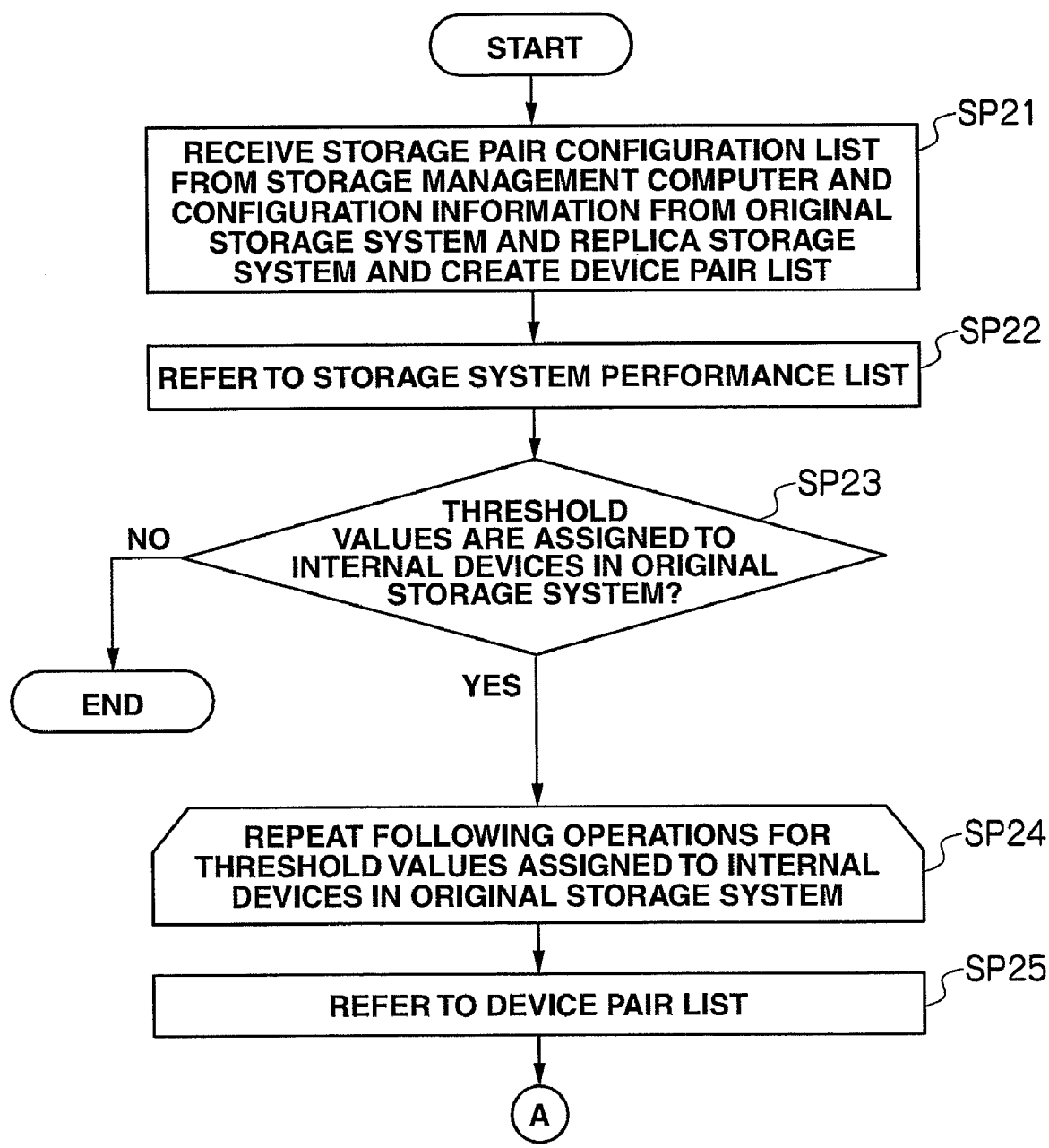
FIG. 23 is a flowchart showing an example of the entire flow of threshold re-calculation processing performed by the management computer in embodiment 2.
Figure 24:
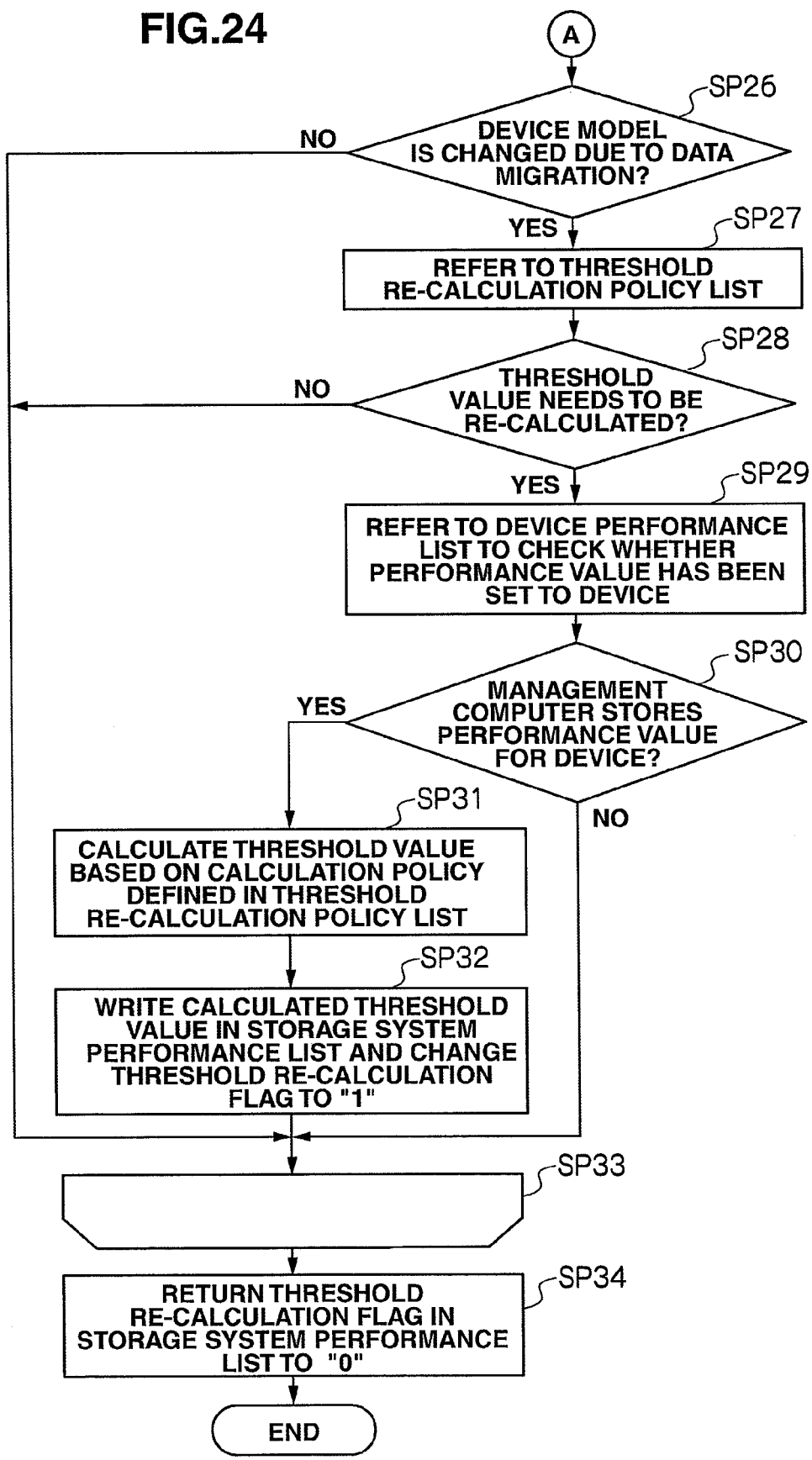
FIG. 24 is a flowchart showing an example of the entire flow of the threshold re-calculation processing performed by the management computer in embodiment 2.

FIGS. 23 and 24 show flowcharts for the threshold recalculation processing stored in the system management program 121 in the management computer 7 in this embodiment.

It should be noted that the description will be given with the agent of each operation in the processing being a program in order to clearly describe the content of operations performed by the processor 72 in the management computer 7 based on the program; however, it is obvious that the processor 72 actually performs each operation based on the relevant program.

When the report reporting that the data migration processing has started is received from the storage management computer 8, the system management program 121 acquires the storage pair configuration list 103 from the storage management computer 8 and the configuration information from each list in the first (original) storage system 3 and in the second (replica) storage system 4, and creates the device pair list 123 (step SP21).

Next, when the report reporting that the data migration processing is received from the storage management computer 8, the system management program 121 refers to the storage system performance list 122 (step SP22). Then the system management program 121 checks whether the threshold values of alert have been assigned to the internal devices in the first (original) storage system 3 (step SP23).

If the threshold values of alert have not been assigned to the internal devices in the first (original) storage system 3 (step SP23: NO), the system management program 121 terminates the processing. On the other hand, if the threshold values of alert are assigned to the internal devices (step SP23: YES), the system management program 121 repeats the operations from steps SP 24 to SP33 for all the relevant threshold values of alert (step SP24).

First, the system management program 121 refers to the device pair list 123 (step SP25), and checks whether there is a change in a model between the devices before the data migration and the devices after the data migration (step SP26).

If there is no change in the model (step SP26: NO), the system management program 121 does not re-calculate the threshold value of alert. On the other hand, if there is a change in the model (step SP26: YES), the system management program 121 refers to the threshold re-calculation policy list 125 for the relevant threshold value of alert (step SP27).

Next, the system management program 121 checks whether or not the threshold value of alert needs to be re-calculated (changed) (step SP28). If the threshold value of alert does not need to be changed (step SP28: NO), the threshold value of alert is not re-calculated. On the other hand, if the threshold value of alert needs to be changed (step SP28: YES), the system management program 121 refers to the threshold re-calculation policy list 125 to find a performance value to be used as a policy for obtaining a re-calculation ratio when the threshold value of alert is changed in accordance with the performance of the relevant device. Next, the system management program 121 refers to the device performance list 124 to find out whether or not the performance value has been set for the device that is a target of the re-calculation of the threshold value of alert (step SP29).

The system management program 121 then checks whether the management computer 7 stores the performance value of the relevant device (step SP30). If, as a result of the above check, the management computer 7 does not store the performance value of the relevant device (step SP30: NO), the system management program 121 does not re-calculate the threshold value of alert. On the other hand, if the management computer 7 stores the performance value of the relevant device (step SP30: YES), the system management program 121 calculates the threshold value of alert using the re-calculation policy defined in the threshold re-calculation policy list 125 (step SP31).

Then the system management program 121 writes the calculated threshold value of alert in the storage system performance list 122 and changes the relevant threshold re-calculation flag in the storage system performance list 122 to "1," which indicates that the re-calculation is complete (step SP32).

After the threshold re-calculation from step SP24 to step SP33 has been performed for all the threshold values, the system management program 121 returns all the threshold re-calculation flags to "0" in the storage system performance list 124 (step SP34).

The calculation method for a threshold value of alert for a device will be described in detail. Suppose the threshold value of alert for I/O amount per unit time is set to "100" and the threshold value of alert for operation ratio is set to "80%" in the RAID group 51 having the RAID group ID "RG1" in the configuration shown in FIG. 6. If the data migration processing is performed and the model of the magnetic disk 35 in the "RG1" RAID group 51 has been changed from "DISK-1" to "DISK-2," since the revolution speed of the "DISK-1" magnetic disk 35 is "100" while the revolution speed of the "DISK-2" magnetic disk 35 is "200," the threshold value of alert for the I/O amount per unit time for the "RG1" RAID group 51 is re-set to "200" based on a re-calculation policy in which the threshold is re-calculated in proportion to the revolution speed of the relevant magnetic disk. On the other hand, the threshold for the operation ratio of the "RG1" RAID group 51 is not changed based on the re-calculation policy in which the re-calculation is not performed for the operation ratio.

It should be noted that the above-described threshold calculation method does not limit means for realizing the invention in the present application, and threshold values may be calculated by methods other than the above method.

In this embodiment, the situation in which the storage ID of the first (original) storage system 3 is adopted in the second (replica) storage system 4 in the process of data migration from the first (original) storage system 3 to the second (replica) storage system 4 has been described. However, in actuality, the storage ID of the first (original) storage system 3 does not have to be taken over by the storage ID of the second (replica) storage system 4. A possible method that can be employed in such a case would be as follows: the management computer 7 acquires the storage ID of the first (original) storage system 3 and the storage ID of the second (replica) storage system 4 from the storage management computer 8 and changes the storage ID in the storage system performance list 83 from the storage ID of the first (original) storage system 3 to that of the second (replica) storage system 4.

In addition, in this embodiment, the situation in which the data migration from the first (original) storage system 3 to the second (replica) storage system 4 is started based on the command from the storage administrator has been described.

However, in actuality, configuration information and data are constantly synchronized between the first (original) storage system 3 and the second (replica) storage system 4, and therefore I/O for the first (original) storage system 3 may be adopted in the second (replica) storage system 4 when, for example, a failure occurs in the first (original) storage system 3. A possible method that can be employed in such a case would be as follows: the management computer 7 acquires the storage ID of the first (original) storage system 3 and the storage ID of the second (replica) storage system 4 from the storage management computer 8 and changes the storage ID of the storage system performance list 122 from storage ID of the first (original) storage system 3 to that of the second (replica) storage system 4 simultaneously with the re-calculation processing for a threshold value of alert.

As described above, if there is a change in performance between an internal device in the first (original) storage system 3 and the corresponding internal device in the second (replica) storage system 4 during the data migration from the first (original) storage system 3 to the second (replica) storage system 4, the threshold value of alert assigned to the relevant internal device is re-calculated in accordance with the performance value. Accordingly, a threshold value for alert suitable for each internal device can be set for each internal device even after data migration processing between the first and second storage systems 3 and 4, whose internal devices have performances different from each other.

(3) Embodiment 3

In embodiment 3, the below description will describe a method for adopting threshold values assigned to internal devices in the first (original) storage system 3 in a second (replica) storage system in the situation where when the data migration processing is performed between the first and second storage systems 3 and 4, whose physical configurations (i.e., the magnetic disks 35, the controller 36 and I/O port 36) are different, and there is a change in configuration between a certain internal device in the first (original) storage system 3 and the corresponding internal device in the second (replica) storage system, the threshold value that has been assigned to the relevant internal device in the first storage system 3 is re-calculated based on the configuration of the corresponding internal device in the second (replica) storage system 4 and then adopted in the second (replica) storage system 4.

Figure 25:
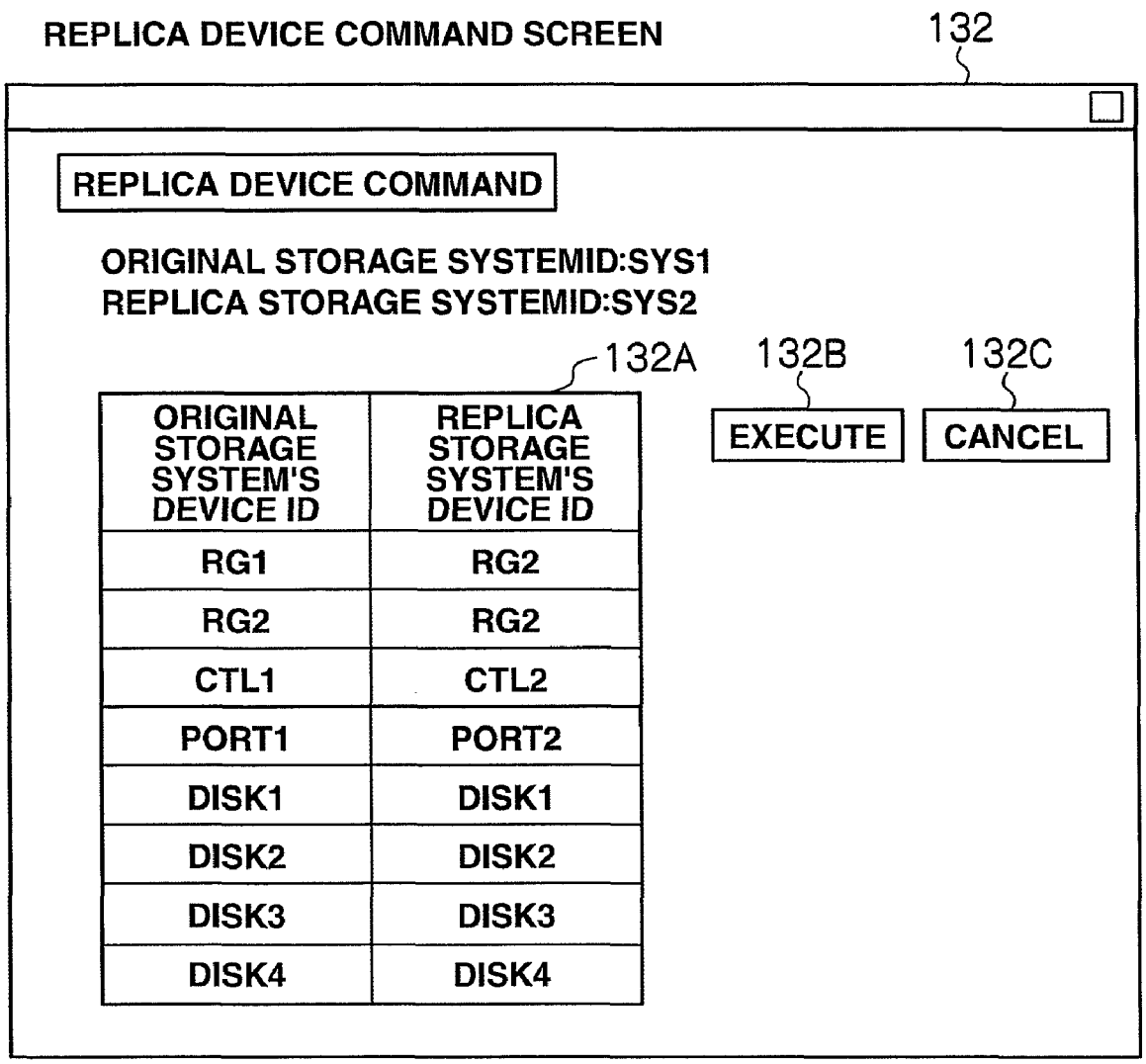
FIG. 25 shows an example of a screen displayed on the storage management computer in embodiment 3.
Figure 26:
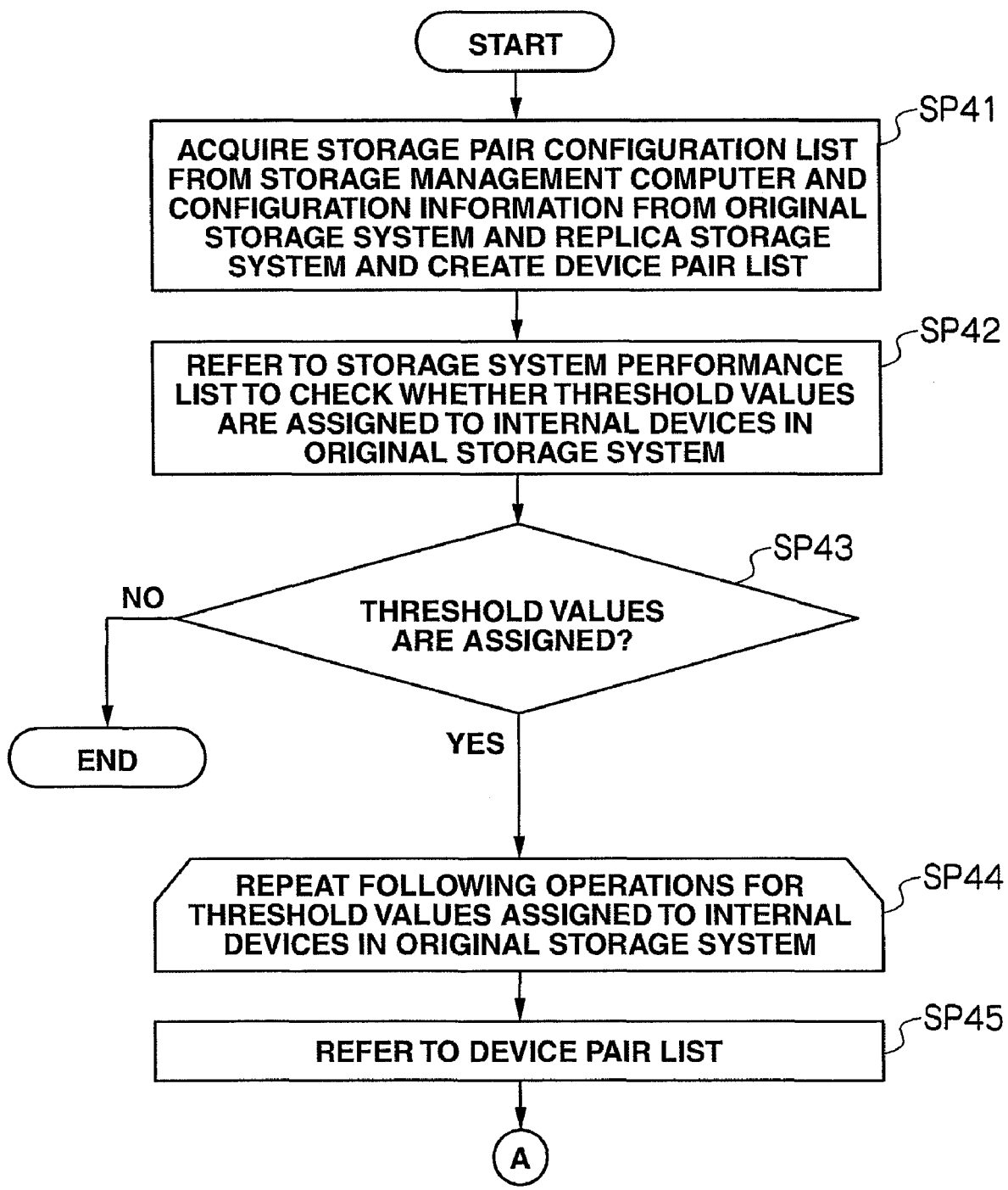
FIG. 26 is a flowchart showing an example of the entire flow of threshold re-calculation processing performed by the management computer in embodiment 3.
Figure 27:
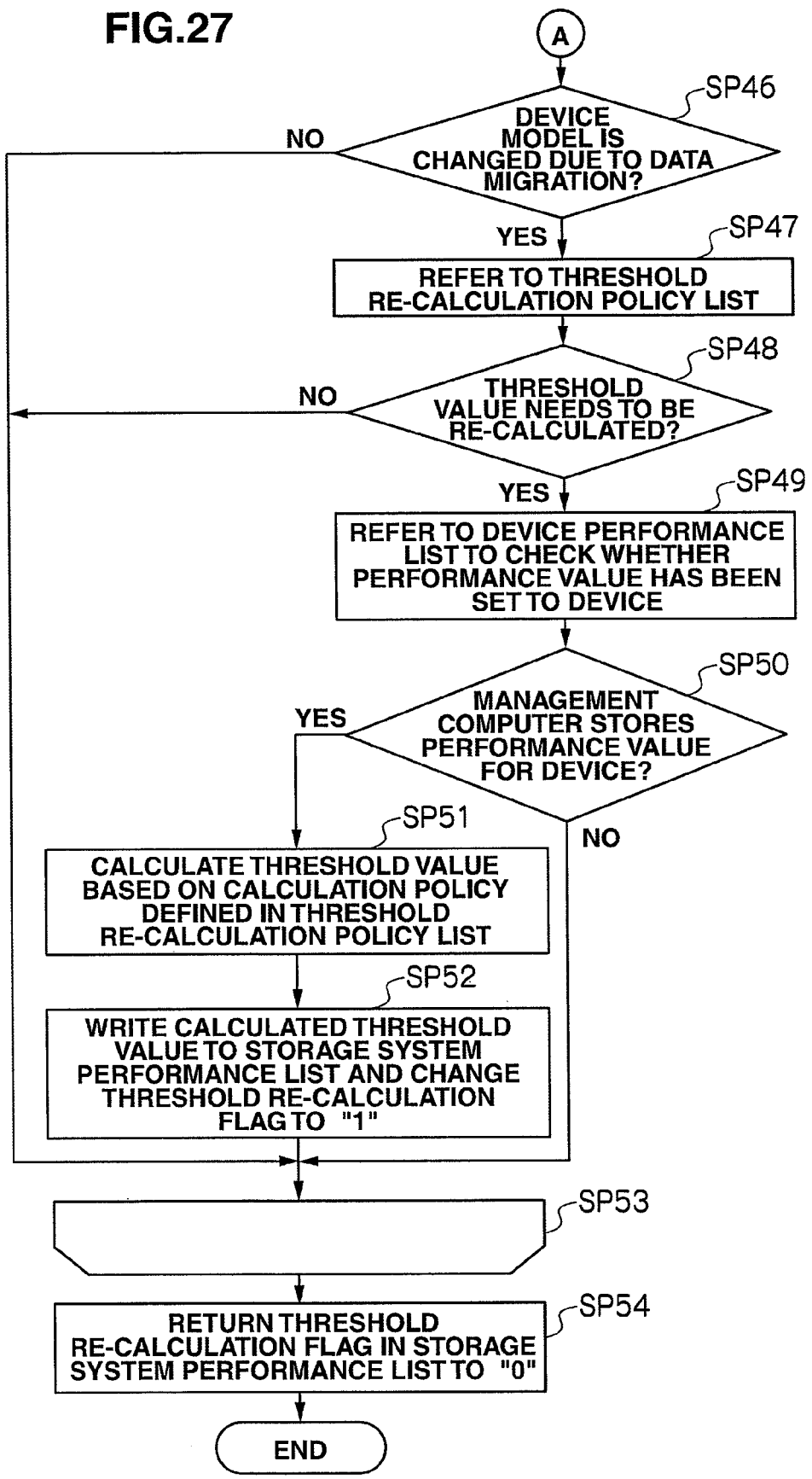
FIG. 27 is a flowchart showing an example of the entire flow of the threshold re-calculation processing performed by the management computer in embodiment 3.
Figure 28:
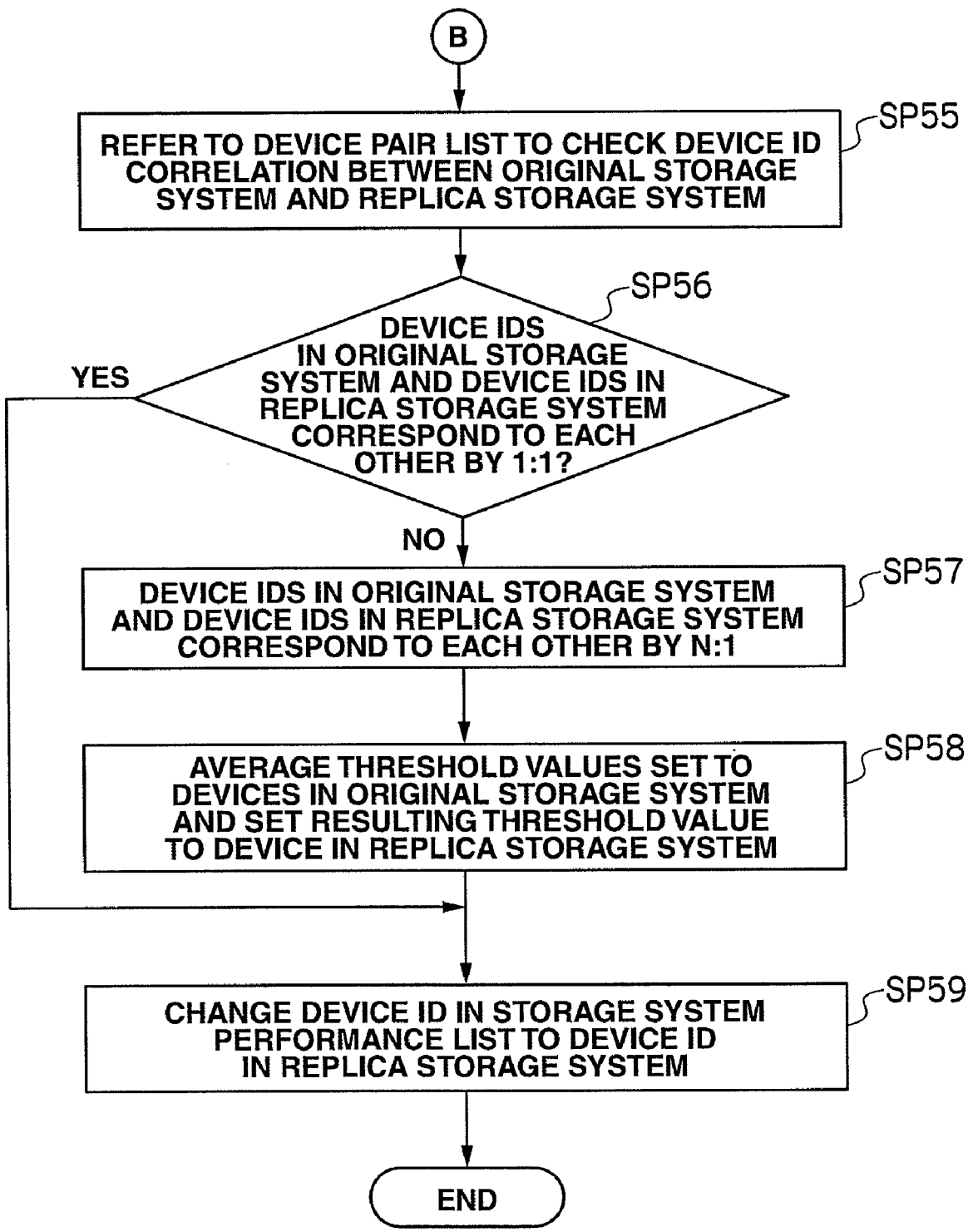
FIG. 28 is a flowchart showing an example of the entire flow of the threshold re-calculation processing performed by the management computer in embodiment 3.

The configuration of the computer system 1 after the threshold re-calculation processing by the management computer 7 is applied in embodiment 2 will be described. The configurations of the host computer 2 and the first and second storage systems 3 and 4 are same as those shown in FIGS. 2 and 3. Also, the storage management computer 8 has the same configuration as the conventional configuration (FIG. 5), except that the storage management computer 8 additionally includes a data migration program 102 that additionally includes a replica device command screen as shown in FIG. 25. In addition, the management computer 7 has the same configuration as the conventional configuration (FIG. 17), except that the management computer 7 includes a system management program 133 that additionally includes threshold review processing as shown in FIGS. 26 to 28 is added.

FIG. 25 shows a display example of the replica device command screen 132 displayed for the storage administrator on the storage management computer 8 when the storage administrator commands, using the storage management computer 8, execution of the data migration processing between the first and second storage systems 3 and 4. This screen is displayed after the data migration command screen 112 shown in FIG. 15 is completed.

The replica device command screen 132 includes: a device ID specification field 132A for specifying, concerning a device in the first (original) storage system 3, the ID of the replica device in the second (replica) storage system 4; an execution button 132B that is clicked after confirming the specified parameter in order to set a device specification command; and a cancellation button 132C that is clicked in order to cancel the setting of the device specification command.

The administrator checks the specified parameter and clicks the execution button 132B to continue the processing or clicks the cancellation button 132C to cancel the processing. When the execution button 132B is clicked, the storage management program 131 in the storage management computer 8 commands the first (original) storage system 3 and the second (replica) storage system 4 to start the data migration processing. When the cancellation button 132C is clicked, the storage management program 131 in the storage management computer 8 terminates the processing without transmitting the above command to the first (original) storage system 3 and the second (replica) storage system 4.

FIG. 25 shows an example of specific values for the device IDs in the first (original) storage system 3 and the device IDs in the second (replica) storage system 4, the values being input in the replica device command screen 132. For example, the RAID groups having the RAID group IDs "RG1" and "RG2" in the first (original) storage system 3 having the storage ID "SYS1" correspond to the RAID group 51 having the RAID group ID "RG2" in the second (replica) storage system 4 having the storage ID "SYS2." In this embodiment, processing performed by a plurality of devices in the first (original) storage system 3 can be integrally performed by one device in the second (replica) storage system 4.

FIGS. 26 to 28 show flowcharts for threshold review processing included in the system management program 133 in the management computer 7 in this embodiment.

When a report reporting that the data migration processing is started is received from the storage management computer 8, the system management program 133 acquires the storage pair configuration list 103 from the storage management computer 8 and the configuration information from each list in the first (original) storage system 3 and in the second (replica) storage system 4 to create the device pair list 123 (step SP41). The following operations in steps SP24 to SP54 are same as those in steps SP22 to SP34 shown in FIG. 2 in embodiment 2 described above.

Next, the system management program 133 refers to the pair device list 123 after re-calculating the threshold value based on the performance of the relevant device and checks the correlation between the device IDs in the first (original) storage system 3 and the device IDs in the second (replica) storage system 4 (step SP55). Here, there are two possible correlations for the devices: a "1:1" correlation, where one device ID in the first (original) storage system 3 corresponds to one device ID in the second (replica) storage system 4; and an "N:1" correlation, where N device IDs in the first (original) storage system 3 correspond to one device ID in the second (replica) storage system 4, i.e., a plurality of devices are integrated in one device.

Next, the system management program 133 checks whether the device IDs in the first (original) storage system 3 and the device IDs in the second storage system 4 "1:1" correspond to each other (step SP56). If the device IDs in the first (original) storage system 3 and the device IDs in the second (replica) storage system 4 "1:1" correspond to each other (step SP56:YES), the system management program 133 changes the relevant device ID in the storage system performance list 122 to the corresponding device ID in the second (replica) storage system 4 (step SP59), and terminates the processing. On the other hand, if the device IDs in the first (original) storage system 3 and the device IDs in the second (replica) storage system 4 do not "1:1" correspond to each other (step SP56: NO), the system management program 133 confirms that the device IDs in the first (original) storage system 3 and the device IDs in the second (replica) storage system 4 "N:1" correspond to each other (step SP57).

Next, the system management program 133 averages the threshold values of alert assigned to the relevant devices in the first (original) storage system 3 for each metric, and sets the obtained threshold value of alert to the second (replica) storage system 4 (step SP58). Then the system management program 133 changes the relevant device ID in the storage system performance list 122 to the corresponding device ID in the second storage system 4 (step SP59), and terminates the processing.

The calculation method for a threshold value of alert for each device will be described below in detail. Suppose the threshold value of alert for the operation ratio of the RAID group 51 having the RAID group ID "RG1" is set to "80%, while the threshold value for the operation rate of the RAID group 51 having the RAID group ID "RG2" is set to "90%." In this case, if the "RG1" and "RG2" RAID groups 51 are integrated to the "RG1" RAID group 51 in the second (replica) storage system 4 as a result of the data migration processing, the threshold values for the "RG1" and "RG2" RAID groups 51 are averaged, so the threshold value for the operation rate of the "RG1" RAID group 51 in the second (replica) storage system 4 is set to "85%."

It should be noted that the above-described threshold calculation method does not limit the means for realizing the invention in the present application, and methods other than the above method may be used for calculating threshold values.

In this embodiment, the threshold re-calculation method used in the situation in which the processing performed by a plurality of devices is integrated to one device in the process of data migration from the first (original) storage system 3 to the second (replica) storage system 4, has been described. However, the processing performed by one device may be divided into a plurality of devices in the process of data migration from the first (original) storage system 3 to the second (replica) storage system, and, in this situation, a method in which the administrator inputs in advance a division policy for a threshold value of alert may be employed.

Described above was the threshold re-calculation processing in this embodiment.

As described above, when the balance of storage processing capacity and input/output loading is re-adjusted between the first and second storage systems 3 and 4 and the device configuration is changed, a threshold value calculated in accordance with the new device configuration can be set.

(4) Operations and Advantages

As described above, when the above-described data migration processing is performed between the first and second storage systems 3 and 4, the threshold values assigned to the internal devices in the first (original) storage system 3 are automatically adopted in the second (replica) storage system 4 in the computer system 1.

Accordingly, the threshold values that the administrator assigned to the internal devices in the first (original) storage system 3 can be set in the second replica storage system 4 without the administrator re-setting them.

Also, in the computer system 1, the management computer 7 acquires the model information of the internal devices from the first storage system 3 and the second storage system 4 and stores in advance the performance information of the devices in the first (original) storage system 3 and the second (replica) storage system 4. In the computer system 1, simultaneously with the data migration from the first (original) storage system 3 to the second (replica) storage system 4, the management computer 7 re-calculates the threshold value assigned to a certain internal device in the first storage system 3 in accordance with the performance of the paired internal device in the second storage system 4.

Accordingly, the problem—the threshold value that has been set based on the performance of the relevant device loses its original function because the performance of this device has been changed without being noticed by the administrator—can be efficiently prevented, and the threshold value can be automatically set in the second storage system 4.

In addition, in the computer system 1, the management computer 7 acquires the model information of the internal devices and the internal device configuration correlation between the first and second storage systems 3 and 4 respectively from the storage management computer 8, the first (original) storage system 3 and the second (replica) storage system 4, and stores in advance the performance information of the internal devices in the first and second storage systems 3 and 4. Then, in the computer system 1, the management computer 7 recalculates, simultaneously with the data migration from the first (original) storage system 3 to the second (replica) storage system 4, the threshold value assigned to an internal device in the first (original) storage system 3 in accordance with the performance of the paired internal device in the second (replica) storage system 4 and the storage configuration of the second (replica) storage system 4.

Accordingly, the problem—in which the threshold value that has been set based on the storage configuration of the first (original) storage system 3 loses its original function because the configurations of the first (original) storage system 3 and the second (replica) storage system 4 have been changed without being noticed by the administrator—can be efficiently prevented, and the threshold value and the storage configuration can be automatically set in the second storage system 4.

Therefore, according to this invention, when data is migrated from the first (original) storage system 3 to the second (replica) storage system 4, management computer 7 can manage the performance of devices as management targets using threshold values and in accordance with changes in dynamically-changing device configurations.

This invention can be widely applied in management apparatuses used for computer systems and software for managing the same.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a first storage system including devices that are various components required for storing data transmitted from a host computer;

a second storage system that is coupled to the first storage system via a network, and includes devices that are various components required for storing data transmitted from the first storage system; and a management apparatus that is coupled to the first and second storage systems via a network, and manages the first and second storage systems, wherein the management apparatus includes: a storage unit for storing configuration information, model information, performance information, threshold recalculation policy information and threshold values used for performance management regarding the devices in the first and second storage systems coupled to the management apparatus; and a setting unit that adopts and sets, when internal management information and data are copied from the first storage system to the second storage system, the threshold values assigned to the devices in the first storage systems as a basis to determine threshold values assigned to the devices in the second storage systems;

wherein the management apparatus:

checks by referencing the model information, whether there is any change in a model between a source device in a migration source storage system and a destination device in a migration destination storage system;

when there is a change in the model, refers to the threshold recalculation policy information to determine whether the threshold value needs to be recalculated;

when the threshold value needs to be recalculated, determines from the threshold recalculation policy information, a performance value to be used as a recalculation policy for obtaining a recalculated ratio when the threshold value is changed in accordance with a performance of the destination device:

refers to the performance information to determine whether the performance value has been designated for the destination device;

checks whether the management apparatus stores the performance value for the destination device: and when the management apparatus stores the performance value, recalculates the threshold value using the recalculation policy from the threshold recalculation policy information.

2. The computer system according to claim 1, where the devices in the first storage system and the second storage system have the same physical configuration and the same performance.

3. The computer system according to claim 1, wherein a threshold re-calculation unit averages, when a plurality of devices in the first storage system are integrated to one device in the second storage system, the threshold values assigned to the plurality of devices and sets the resulting threshold value as a threshold value for the integrated device.

4. The computer system according to claim 1, wherein the devices to which the threshold values are assigned are each a RAID group defined by a plurality of magnetic disks, a controller for controlling the first or second storage system, or a port used for coupling with the host computer.

5. A method for determining threshold recalculation in a computer system including:

a first storage system including devices that are various components required for storing data transmitted from a host computer;

a second storage system that is coupled to the first storage system via a network, and includes devices that are various components required for storing data transmitted from the first storage system; and a management apparatus that is coupled to the first and second storage systems via a network, and manages the first and second storage systems, wherein the management apparatus includes: a storage unit for storing configuration information, model information, performance information, threshold recalculation policy information and threshold values used for performance management regarding the devices in the first and second storage systems coupled to the management apparatus; and a setting unit that adopts and sets, when internal management information and data are copied from the first storage system to the second storage system, the threshold values assigned to the devices in the first storage systems as a basis to determine threshold values assigned to the devices in the second storage systems;

wherein the method is effected by the management apparatus which:

checks by referencing the model information, whether there is any change in a model between a source device in a migration source storage system and a destination device in a migration destination storage system;

when there is a change in the model, refers to the threshold recalculation policy information to determine whether the threshold value needs to be recalculated;

when the threshold value needs to be recalculated, determines from the threshold recalculation policy information, a performance value to be used as a recalculation policy for obtaining a recalculated ratio when the threshold value is changed in accordance with a performance of the destination device;

refers to the performance information to determine whether the performance value has been designated for the destination device;

checks whether the management apparatus stores the performance value for the destination device; and when the management apparatus stores the performance value, recalculates the threshold value using the recalculation policy from the threshold recalculation policy information.

* * * * *